United States Patent [19]

Karlock

[11] Patent Number: 5,109,280
[45] Date of Patent: Apr. 28, 1992

[54] VIDEO SWITCHER/EFFECTS GENERATOR

[76] Inventor: James A. Karlock, 3311 NE. 35th Ave., Portland, Oreg. 97212

[21] Appl. No.: 397,717

[22] Filed: Aug. 23, 1989

Related U.S. Application Data

[62] Division of Ser. No. 798,591, Nov. 15, 1985, Pat. No. 4,862,272.

[51] Int. Cl.$^5$ .................. H04N 5/262; H04N 5/275
[52] U.S. Cl. ................................ 358/181; 358/182; 358/183
[58] Field of Search .................. 358/181, 182, 183, 22

[56] References Cited

U.S. PATENT DOCUMENTS 4,356,511 10/1982 Tsujimura ........................ 358/181
4,809,072 2/1989 Pohl .............................. 358/183

Primary Examiner—Tommy P. Chin
Attorney, Agent, or Firm—Dellett, Smith-Hill and Bedell

[57] ABSTRACT

A video effects generator consists of two major components: an electronic video switch and a waveform generator. The switch can give either sharp or soft edges, fade in or out or fade between the two inputs. This switch is driven by a waveform generator to provide switching at a line rate, field rate or both. Effects result when two video sources are alternately selected within the time of one field.

17 Claims, 17 Drawing Sheets

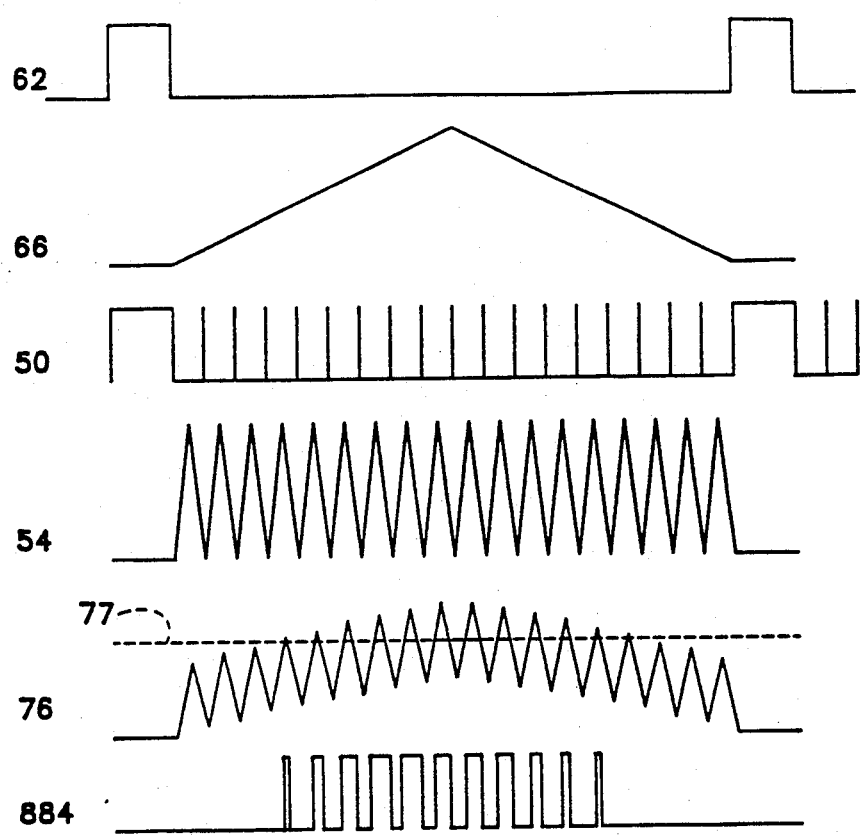
FIG.8(a)
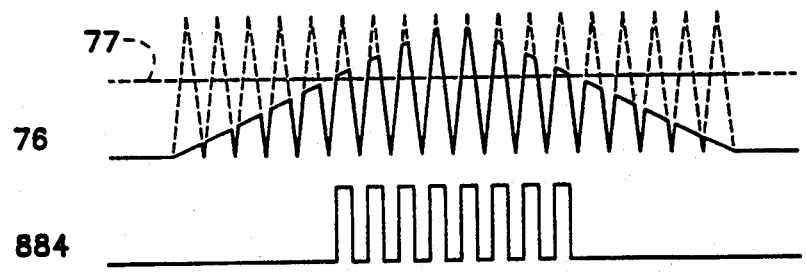
FIG.8(c)
 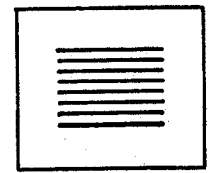
FIG.8(b)  FIG.8(d)

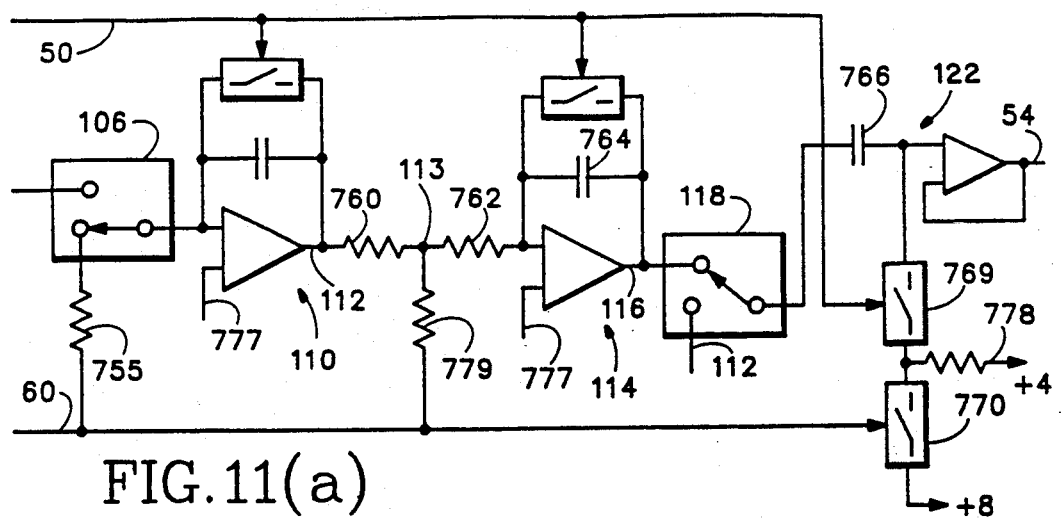
FIG.11(a)
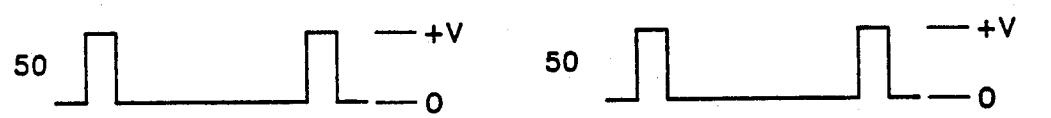
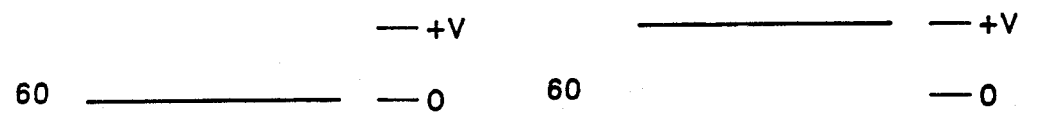
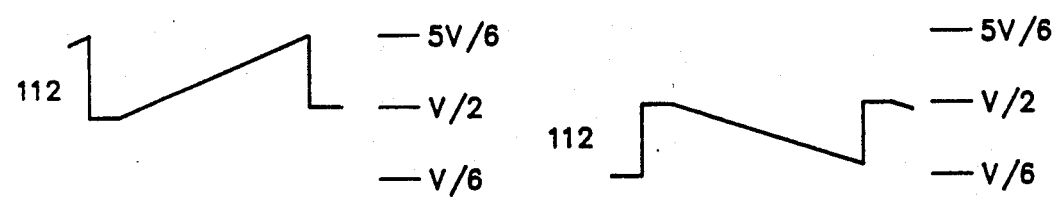
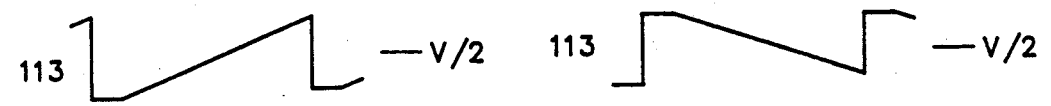
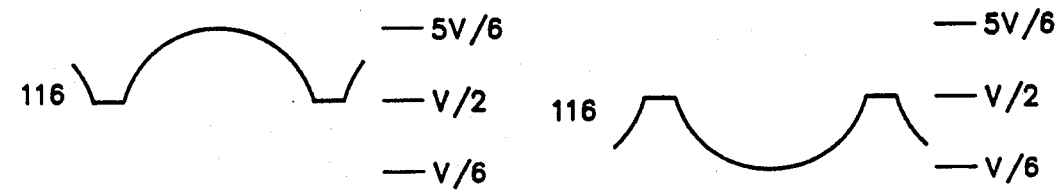
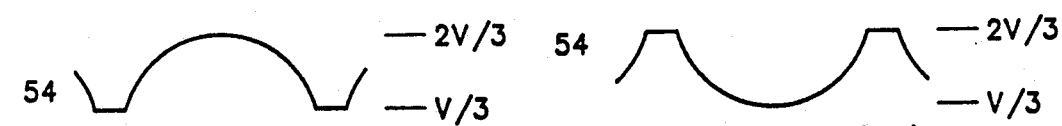
FIG.11(b)     FIG.11(c)

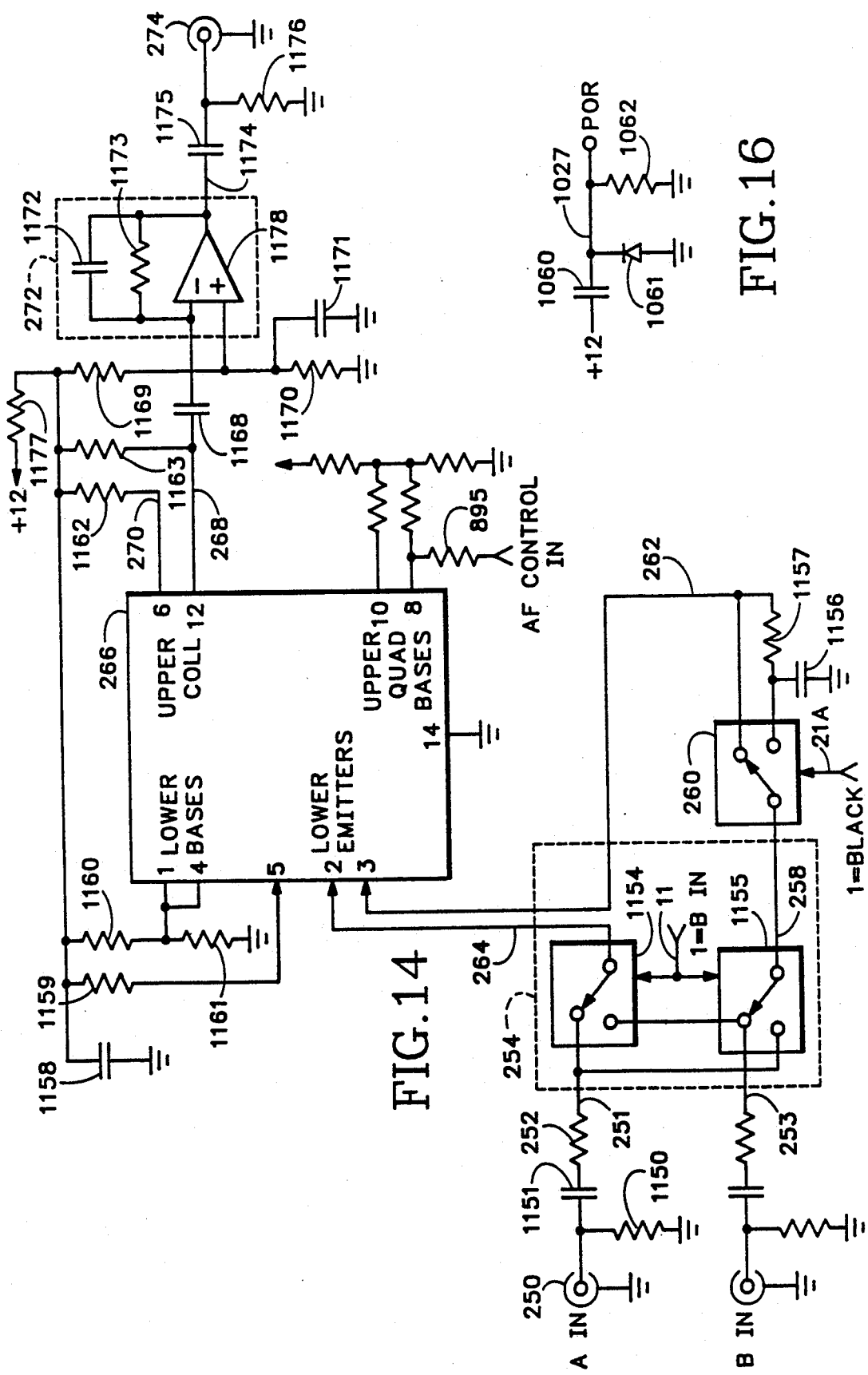

VIDEO SWITCHER/EFFECTS GENERATOR

CROSS-REFERENCE TO RELATED APPLICATION

This is a division of co-pending application Ser. No. 06/798,591 filed Nov. 15, 1985, now U.S. Pat. No. 4,862,272.

BACKGROUND OF THE INVENTION

A video effects generator is a device that receives at least two input video signals and enables an operator to select between the input signals alternately within the time of one field in generating a final program video signal.

The use of video effects generators in the professional studio environment is well known. Such effects generators provide for generation of a wide range of effects from simple wipes and fades, through keying a foreground scene represented by one signal into a background scene represented by another signal, to zooming, tumbling and rotating the foreground scene within the background scene.

Video effects generators suitable for use in a less sophisticated environment than the professional television studio, are currently available, but they are rather limited in the range of effects that they can provide.

SUMMARY OF THE INVENTION

A preferred embodiment of the invention comprises two input terminals, an electronic video switch for adjustably selecting between them, an effects waveform generator for providing the waveforms to drive the video switch, line and field rate pulse generators to synchronize the waveform generator with the video signal, a ramp generator to automatically drive the waveform, an adjustable voltage source to manually drive the waveform generator, a matrix keyboard to select various parameters of the waveform generator, various individual switches to set system configuration, and a background generator which consists of a sync separator and a chroma generator which are selectively combined to provide a black or colored background.

In the preferred video effects generator, one or two video signals are provided to the input terminal by the user. The second input can optionally be an internally generated video background. Then under the control of the effects control waveform generator, the electronic video switch switches or fades between the two inputs and supplies one combined video signal to the output. The effects waveform generator provides both line and field rate ramps, sawtooths and parabolas as well as combinations of these basic waveforms. A matrix keyboard selects which of the various waveforms to combine into a single control signal for the electronic video switch. The signal can have either fast or slow rise times resulting in hard or soft video effects. A slowly varying control signal (1-10 sec duration) can be generated in order to give a dissolve or fade when applied to the electronic video switch. A group of mode switches, each with its own latch, selects various operational modes: standard/slanted patterns, standard/alternate pattern set, manual/automatic transitions, fade/effects type transitions, color/black background, effects to video/background and A/B input select.

BRIEF DESCRIPTION OF THE DRAWINGS

For a better understanding of the invention, and to show how the same may be carried into effect, reference will now be made, by way of example, to the accompanying drawings in which:

FIGS. 8(a) and 8(b) show waveforms for demonstrating the generation of squares and diamonds, FIGS. 9(a) to 9(c), 10(a) to 10(c) and 11(a) to 11(c) are useful in understanding the ramp generator function, the sawtooth generator function, and the parabola generator function, respectively, FIG. 14 is a schematic diagram of the audio switch/fader, FIG. 16 is a schematic diagram of a circuit for generating a power-on reset pulse.

DETAILED DESCRIPTION

Figure 1:
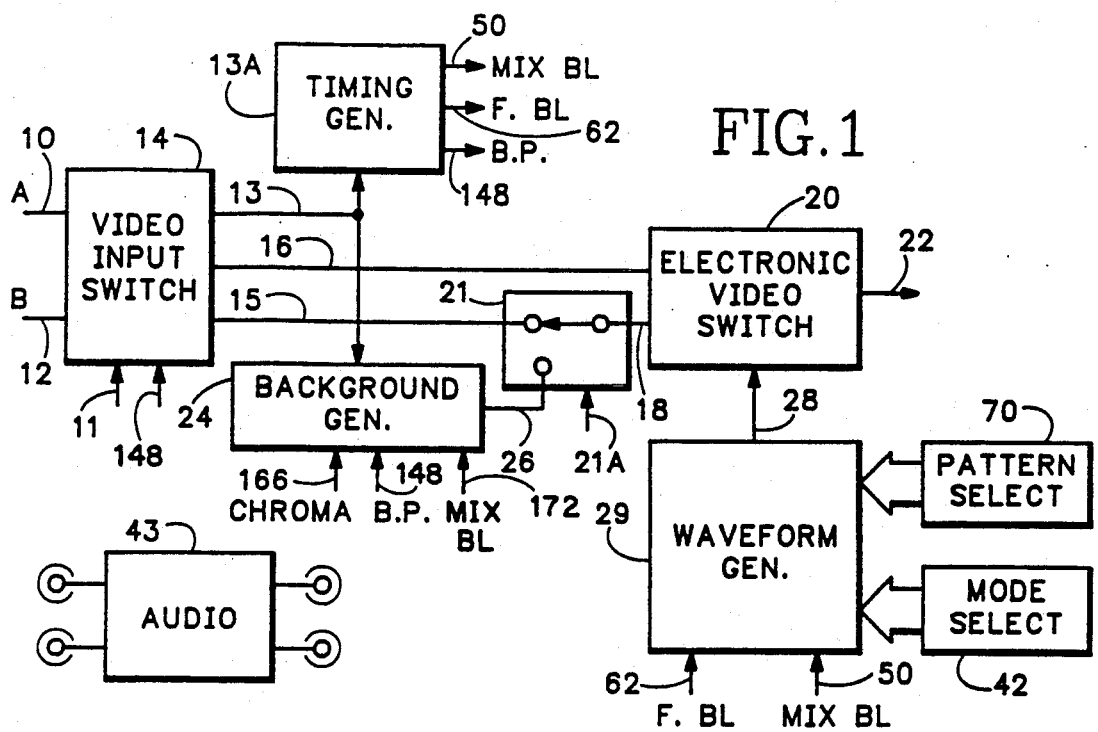
FIG. 1 is an overall block diagram of a video effects generator embodying the present invention.

Referring to FIG. 1, externally-provided video input signals are received at inputs 10 and 12 of an input selector 14, and output video signals having clamped back porch levels are provided on outputs 15 and 16. Depending on the state of control line 11, input selector 14 passes the input 10 to output 16 and input 12 to output 15, or input 10 to output 15 and input 12 to output 16. Additionally, a signal which is essentially the same as that at output 16 is provided to timing generator 13A by way of output 13.

A selector switch 21 is interposed between the input selector 14 and an electronic video switch 20 so that the input 18 to electronic video switch 20 can be selected under the control of line 21A to be either the externally-provided video signal on the output 15 of input selector 14 or an internally generated background signal provided on output 26 of background generator 24.

The electronic video switch 20 has two inputs 16 and 18. Its output 22 corresponds to either input 16, input 18 or a linear combination of these two inputs, depending on the state of effects control line 28. (It will become apparent hereinafter that effects control line 28 in fact comprises two push-pull lines. However, this does not affect the present description.) If the control line 28 is in a low voltage state, then input 16 will be passed to the output 22. If the control line 28 is in a high state then input 18 will be passed to the output 22. If effects control line 28 is at an intermediate voltage, then the output 22 will consist of a linear mixture of inputs 16 and 18. The mixing ratio is a linear function of the voltage on the control line 28.

Figure 2:
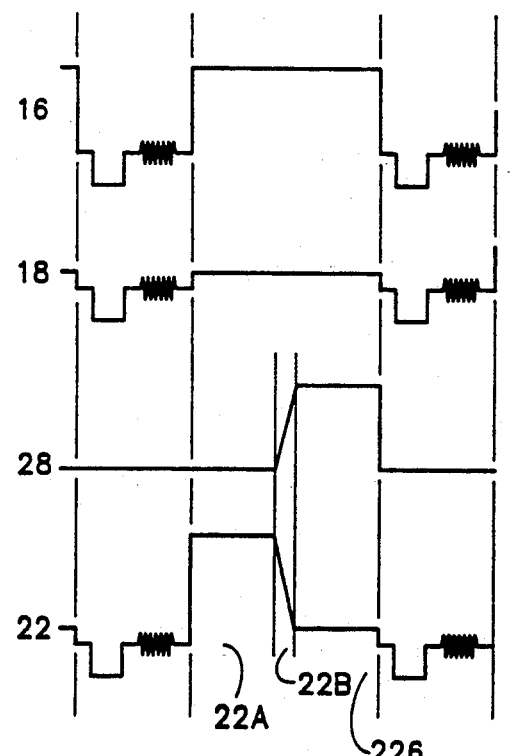
FIG. 2 shows typical waveforms used to generate a split screen effect.
Figure 3:
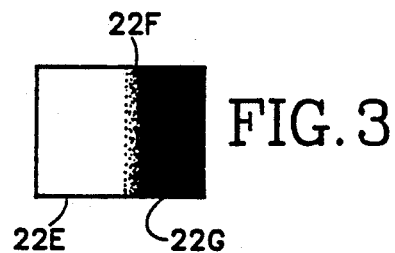
FIG. 3 shows the resultant display on a TV monitor.

FIG. 2 illustrates how the signals on lines 16 and 18 are combined by the electronic video switch 20. When the effects control waveform on line 28 is low, the output waveform on line 22 is identical to the waveform on line 16 as shown by region 22A. When the effects control waveform is in between the high and low states, the output waveform is the algebraic sum of the inputs on lines 16 and 18, with the weighting of the two factors being dependent on the voltage on line 28. See region 22B. Finally, when the effects control waveform is high, the output waveform is identical to the input waveform on line 18, as shown at 22C. FIG. 3 shows a TV monitor displaying the output waveform. Sections 22E, 22F and 22G of the image correspond respectively to the waveform at points 22A, 22B and 22C.

System timing generator 13A accepts video from the input selector 14 via line 13 and provides mixed blanking on line 50, field blanking on line 62 and a back porch pulse on line 148. One or more of these timing signals are used to control operation of input selector 14, waveform generator 29, pattern selector 70, background generator 24, and mode selector 42.

Figure 12A:
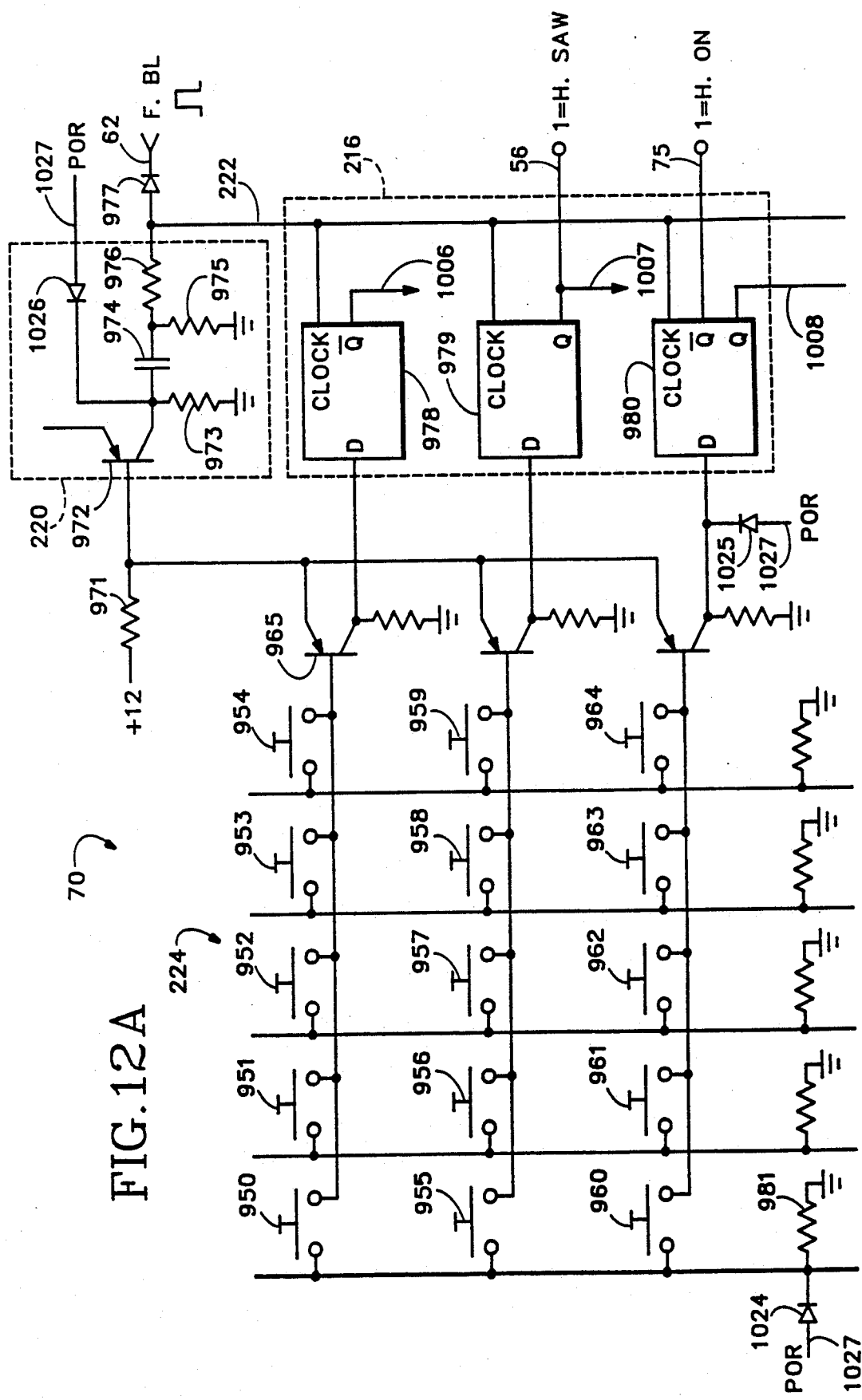
FIGS. 12(A) and 12(B) are schematic diagrams of the pattern select key logic.
Figure 12B:
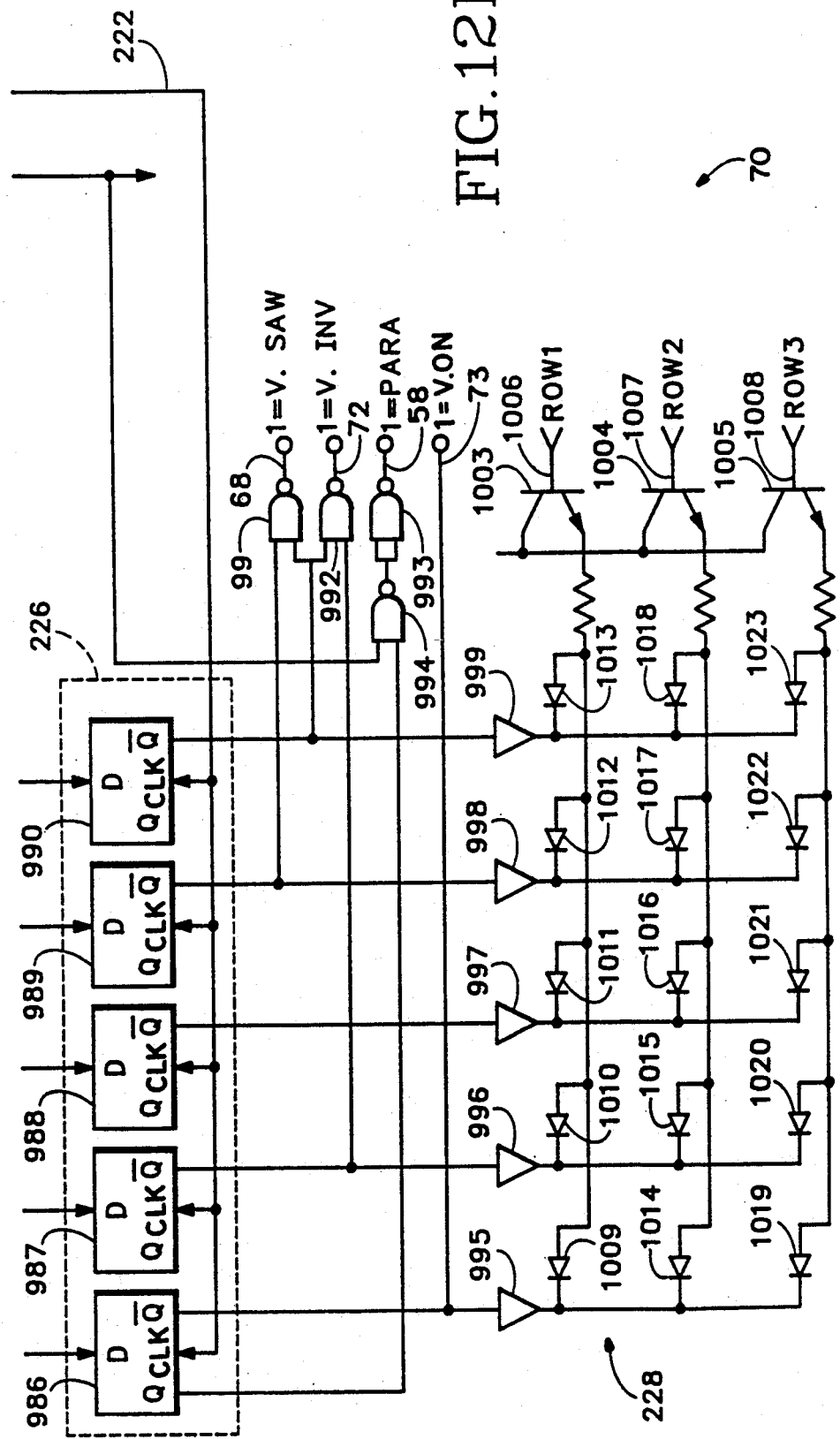

Effects waveform generator 29 supplies the various waveforms required by the electronic video switch 20 via line 28 in order to create effects as well as fades and dissolves. The primary inputs of effects waveform generator 29 are field blanking 62, mixed blanking 50 and various pattern select and mode control lines which will be described in detail with reference to FIGS. 12 and 15.

The background generator 24 accepts video via line 13, back porch clamp pulse via line 148 and optionally accepts chroma on line 166 and mixed blanking on line 172. The background generator 24 supplies selector switch 21, via line 26, with a video signal representing a black or colored field and having its sync and burst derived directly from the original input video.

Mode selector 42 and pattern selector 70 each have control lines which set the state of various control switches throughout the video effects generator in response to user keyboard input.

Figure 4:
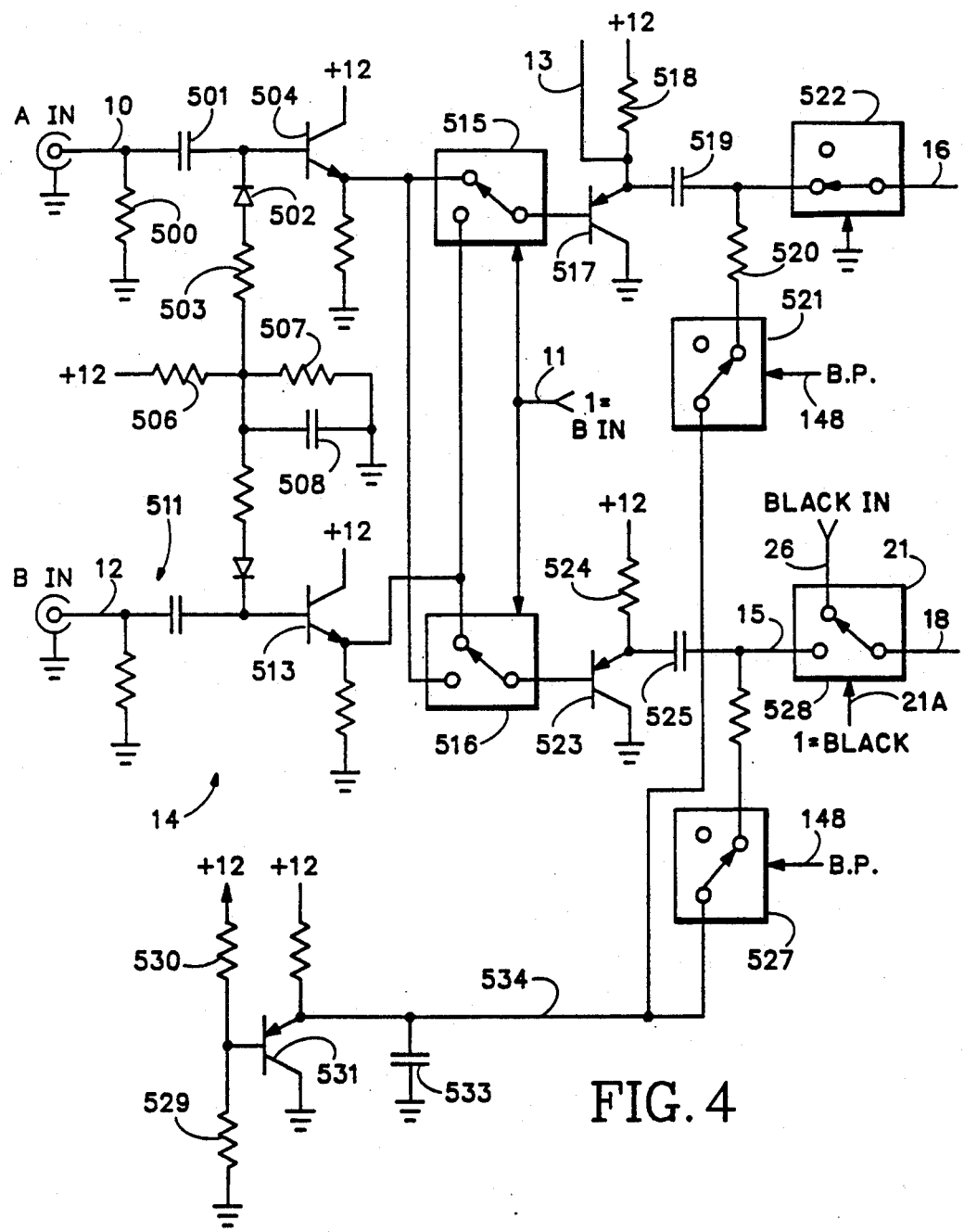
FIG. 4 is a schematic diagram of the input select switch.

Input selector 14 is shown in detail in FIG. 4. Input video is received on line 10 and returned to ground by 75 ohm resistor 500. A bias network formed by resistors 506 and 507 and capacitor 508 supplies a reference voltage for an input clamp formed by capacitor 501, diode 502 and resistor 503. This clamp provides video at constant sync tip voltage to emitter follower transistor 504. An identical channel 511 connected to line 12 shares the same bias network. CMOS switch 515 selects either the emitter of 504 or the emitter of 513 to pass on to the base of transistor 517. Similarly CMOS switch 516 selects either the emitter of 513 or the emitter of 504 to pass on to the base of transistor 523. Whichever emitter is selected by 515, the other emitter is selected by 516. This provides the ability to swap inputs under the control of control line 11. Emitter follower transistor 517 provides isolation between CMOS switch 515 and subsequent stages. The emitter of transistor 517 provides a low impedance output to timing generator 13A over line 13. The emitter of transistor 517 is also coupled by capacitor 519 to a back porch clamp consisting of switch 521 and resistor 520. The switch is closed connecting resistor 520 to bias voltage source line 534, in response to a pulse on line 148 which is time coincident with the back porch of the incoming video signal. This provides an accurate, repeatable clamp at backporch level provided that the d.c. level of burst is not offset from blanking level and provided also that the start and finish of burst are out of phase on each pair of consecutive lines. The junction of resistor 520 and capacitor 519 is connected to line 16 by way of an unused CMOS switch 522 which is provided in order to preserve symmetry with the other output channel of the selector.

The second output channel is the same as that which feeds the line 16, except for the selector switch 21, which is an active CMOS switch. Switch 21 responds to a signal on mode select line 21A by selecting either video from the clamp output 15 or background supplied on line 26 background generator 24. Resistors 530 and 529 provide bias to transistor 531 whose emitter is connected to the voltage source line 534 for clamp switches 521 and 527 and is bypassed to ground by capacitor 533. This provides a convenient bias voltage source of about one-fourth of the positive supply voltage, or about 3 volts. The two clamps ensure that the video signals at the outputs 16 and 18 are accurately clamped to the same DC level.

Figure 5:
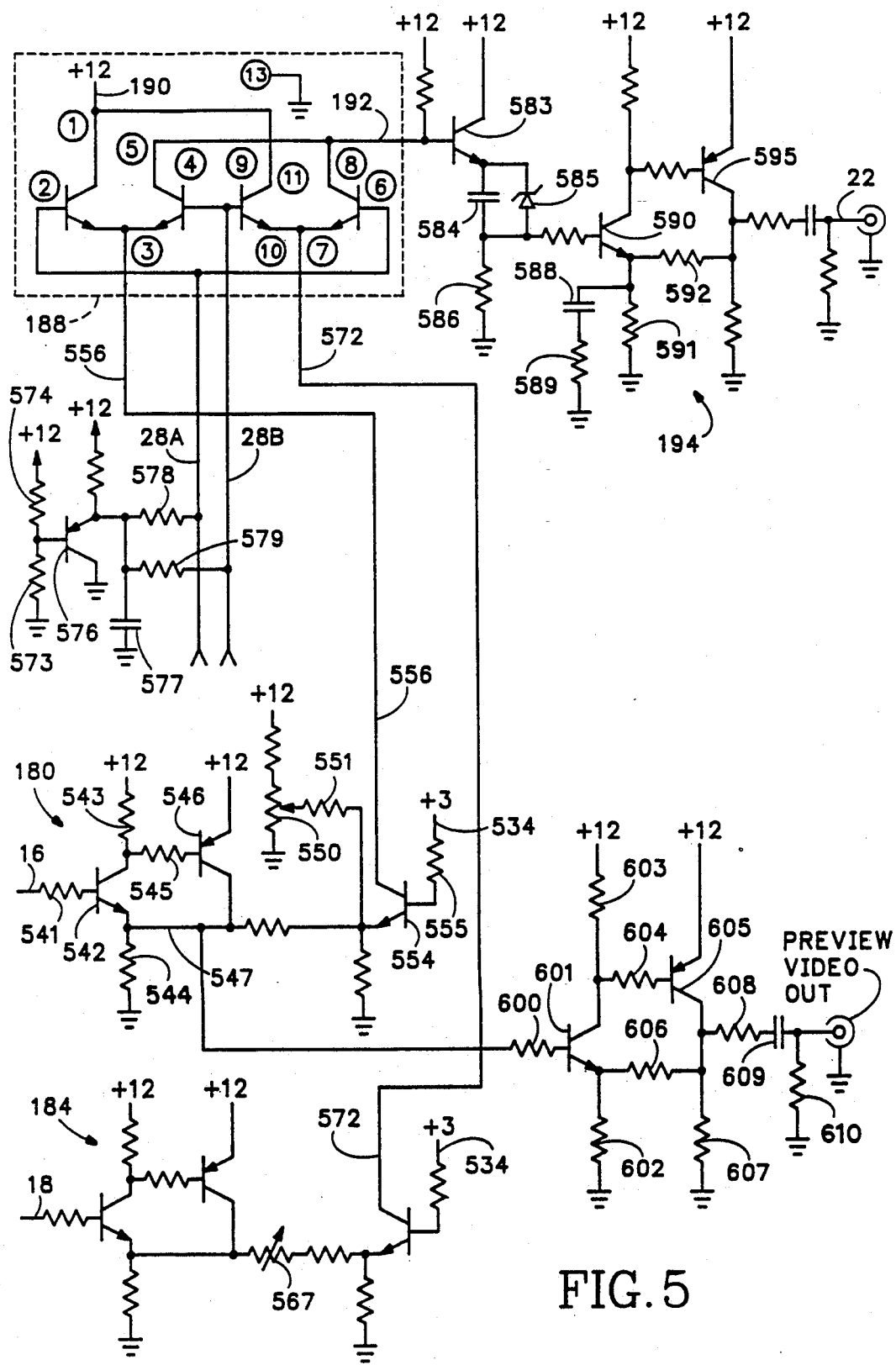
FIG. 5 is a schematic diagram of the electronic video switch.

The electronic video switch 20 is shown in FIG. 5 and consists of four major functional blocks; two voltage-to-current converters 180 and 184, current switch 188 and output amplifier 194. The converter 180 is connected to the line 16 and comprises a compound emitter follower composed of resistors 541, 544, 543 and 545 and transistors 542 and 546. This compound emitter follower provides a high input impedance so as to avoid loading the output channel of the input selector 14. The output line 547 is applied to voltage-to-current converter transistor 554 which supplies a current on line 556 which is a linear function of the voltage on line 547. The bases of transistors 542 and 554 are both driven from the same +3 volts source and therefore the emitters of the two transistors will both be one diode drop below +3 volts and will track each other with changes in temperature. The standing current in transistor 554 can be adjusted by offset match potentiometer 550 whose output is connected to the emitter of transistor 554 via resistor 551. A second similar voltage-to-current converter is provided for the second input, received on the line 18, the only difference being that a gain match potentiometer 567 is provided instead of the offset match potentiometer 550.

The current switch 188 is an integrated circuit of type 3046 and provides a double-pole, double-throw current switch routing the current supplied on lines 556 and 572 to lines 190 and 192 in proportion to the ratio of the voltages on the push-pull control lines 28A and 28B. This provides for soft switching and hard switching, and for fade and dissolve functions. Bias for the integrated circuit current switch 188 is provided by resistors 578 and 579 from the emitter of transistor 576, which is in turn biased by resistors 573 and 574. Capacitor 577 bypasses this supply. Output is taken from line 192 and is isolated by emitter follower 583, then shifted to a lower DC voltage by zener diode 585 which is bypassed by capacitor 584, to reduce the dynamic impedance of the zener diode, and loaded by resistor 586. A compound emitter follower comprising transistors 590 and 595 and having a gain set by resistors 591 and 592 provides sufficient current to properly drive the output 22 with a 1 volt peak-to-peak signal. A high frequency peaking network comprising resistor 589 and capacitor 588 is connected from the emitter of the first transistor 590 to ground.

A preview output is driven from line 547 of the first current-to-voltage converter 180 by means of a second compound emitter follower composed of resistors 600, 602, 603, 604, 606, 607, 608 and 610, transistors 601 and 605 and capacitor 609. The preview video output enables the operator to view the image represented by the signal on line 16 before it is acted upon by switch 20.

Figure 6A:
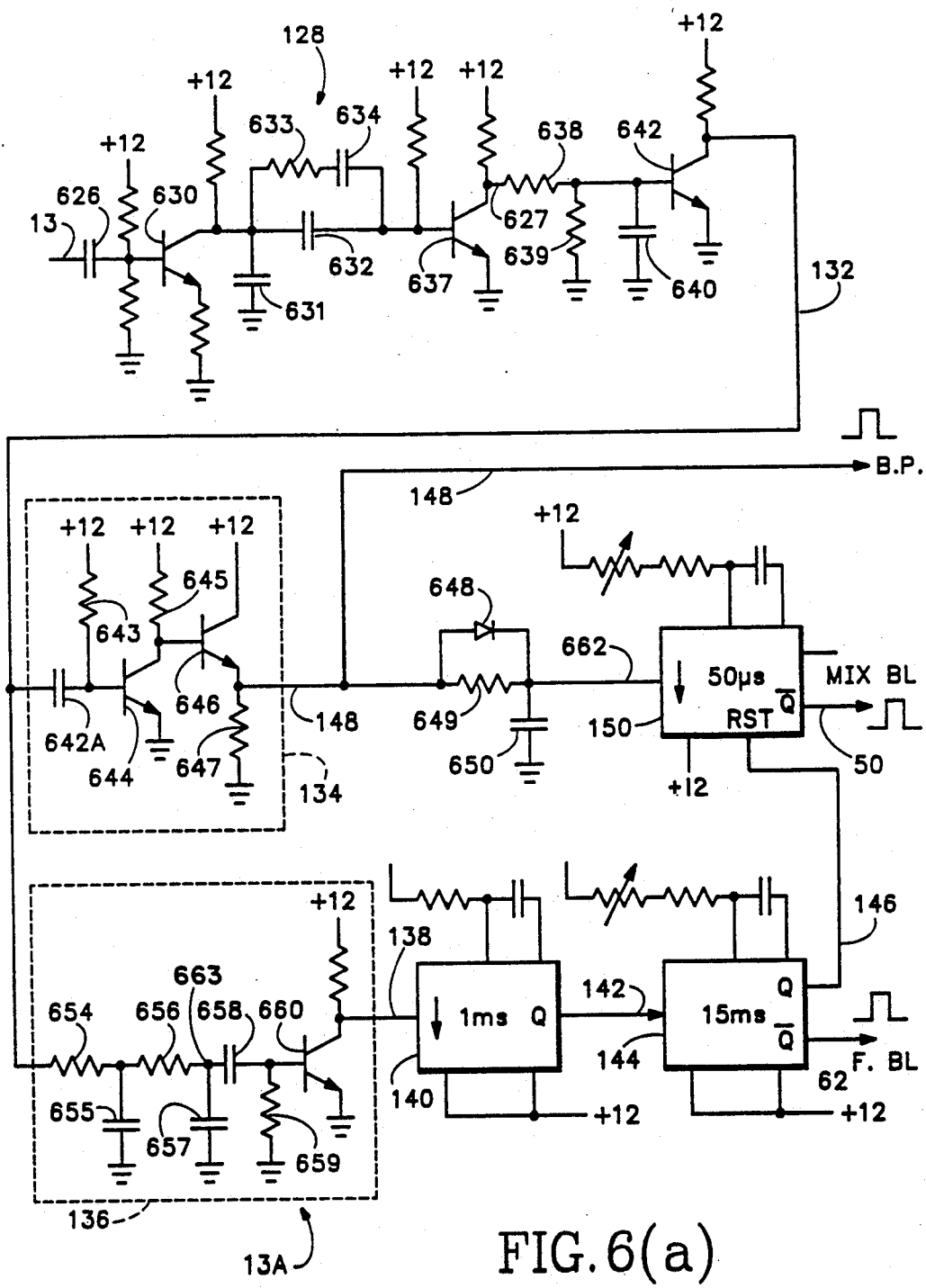
FIG. 6(a) is a schematic diagram of the system timing generator.

The system timing generator 13A, shown in FIG. 6(a), comprises an amplifier and sync separator 128 which provides positive-going mixed sync, i.e., inverted horizontal and vertical sync, on its output line 132. Vertical sync detector 136 supplies a narrow trigger pulse at its output 138 which is applied to a delay one shot 140 arranged such that the trailing edge of its output pulse on line 142 is coincident with the start of active picture area at the top of the screen. The end of this pulse triggers field blanking one shot 144. The period of one shot 144 is equal to the active picture duration and both normal and inverted outputs are supplied at 62 and 146 respectively. Normal blanking is taken from the inverting output of the one shot. Back porch pulse generator 134 is triggered from the trailing edge of the mixed sync supplied on line 132 by sync separator 128. The back porch pulse is applied to the mixed blanking one shot 150 by way of line 148. The end of this pulse is coincident with the start of active video at the left edge of the picture. The period of one shot 150 is equal to the duration of one active picture line. The output of one shot 150 is supplied to various portions of the circuit on line 50. This one shot is deactivated during field blanking by applying field blanking 146 to its reset input.

The sync separator 128 receives video from line 13, which is coupled by capacitor 626 to the base of video inverter transistor 630. Transistor 630 has a gain of about 2, and capacitor 631 connected from the collector of transistor 630 to ground, provides a rolled off high frequency response. Resistor 633 and capacitors 634 and 632 couple video to the base of a sync separator transistor 637 whose collector is coupled to the base of transistor 642 by a low pass filter consisting of resistors 638 and 639 and capacitor 640. Transistor 642 provides squared up positive sync at its collector on line 132.

Half shot 134 consisting of transistors 644 and 646, resistors 643, 645 and 647 and capacitor 642A provide a positive-going pulse of width determined by resistor 643 and capacitor 642A and starting at the trailing edge of sync. This is the back porch pulse and is supplied to various other circuits via line 148. A delay network consisting of resistor 649, capacitor 650 and diode 648 couples the back porch pulse to the trigger input of integrated circuit one shot 150 which triggers on the negative going edge of the input pulse. This is time coincident with the end of horizontal blanking. Except during vertical blanking, when it is deactivated via line 146, one shot 150 responds to the back porch pulse by providing, at its (unused) Q output, a pulse having a duration equal to the active line interval. At all other times, the Q output is low. Therefore, one shot 150 provides mixed blanking at its NOT Q output, which is connected to the line 50.

Figure 6B:
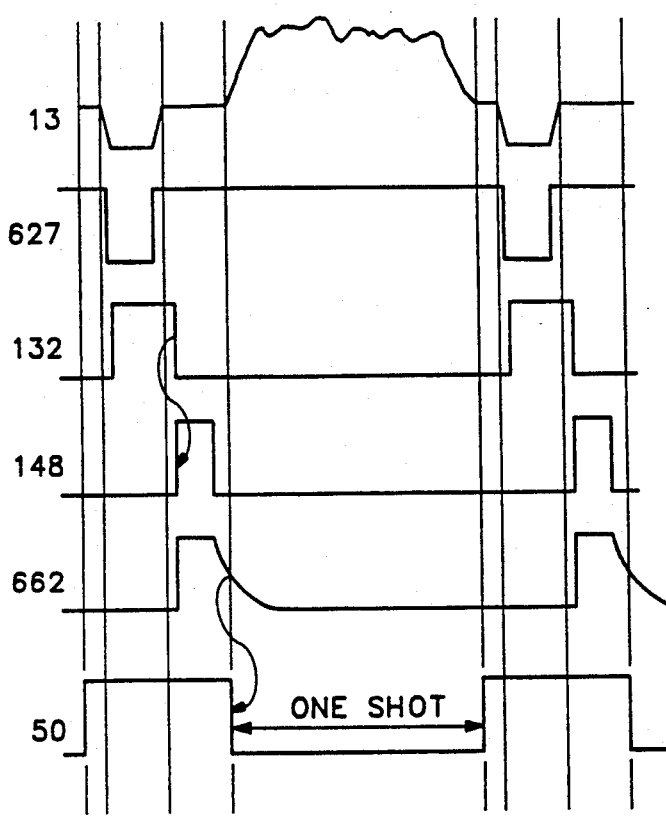
FIG. 6(b) shows horizontal waveforms associated with the timing generator.
Figure 6C:
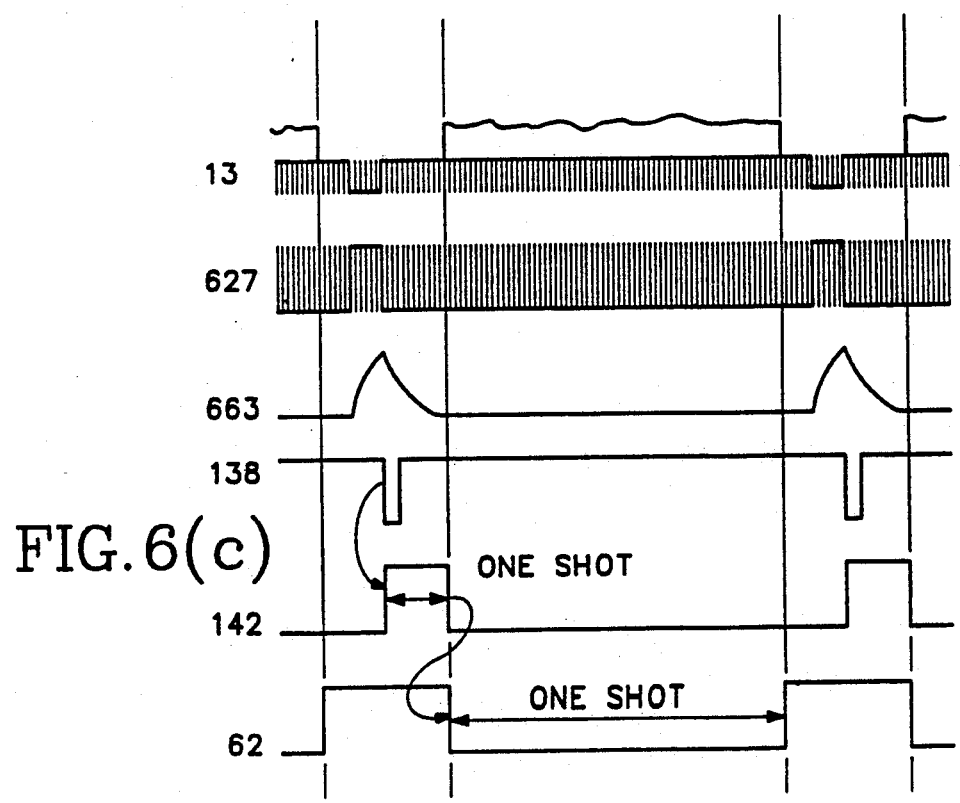
FIG. 6(c) shows vertical waveforms associated with the timing generator.

The mixed sync on line 132 is integrated by resistors 654 and 656 and capacitors 655 and 657 to separate the vertical sync pulse, which is coupled to transistor 660 by capacitor 658. Transistor 660 is biased off by resistor 659 and is only turned on by the positive tips of the integrated vertical sync. The collector of transistor 660 triggers one shot 140 which provides a delay to the end of vertical blanking at which time one shot 144 is triggered. One shot 144 provides at its Q output, which is connected to the line 146, a pulse whose length is equal to the duration of the active portion of one field. The pulse provided at the NOT Q output of the one shot 146 corresponds to the vertical blanking interval and is supplied to various circuits via line 62. Waveforms that occur at various points in the timing generator are shown in FIGS. 6(b) and 6(c).

Figure 7A:
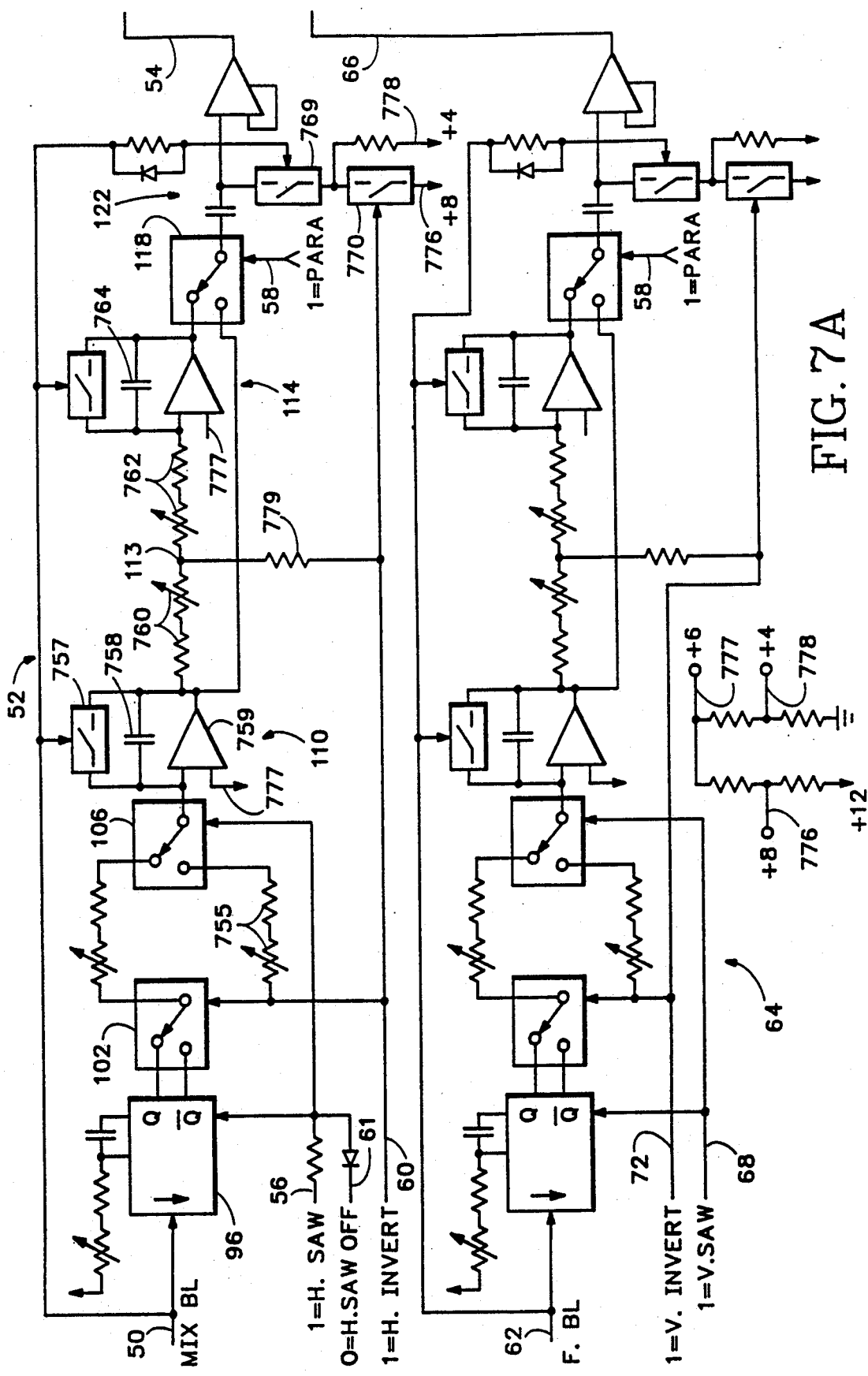
FIGS. 7A and 7B are schematic diagrams of the effects waveform generator.
Figure 7B:
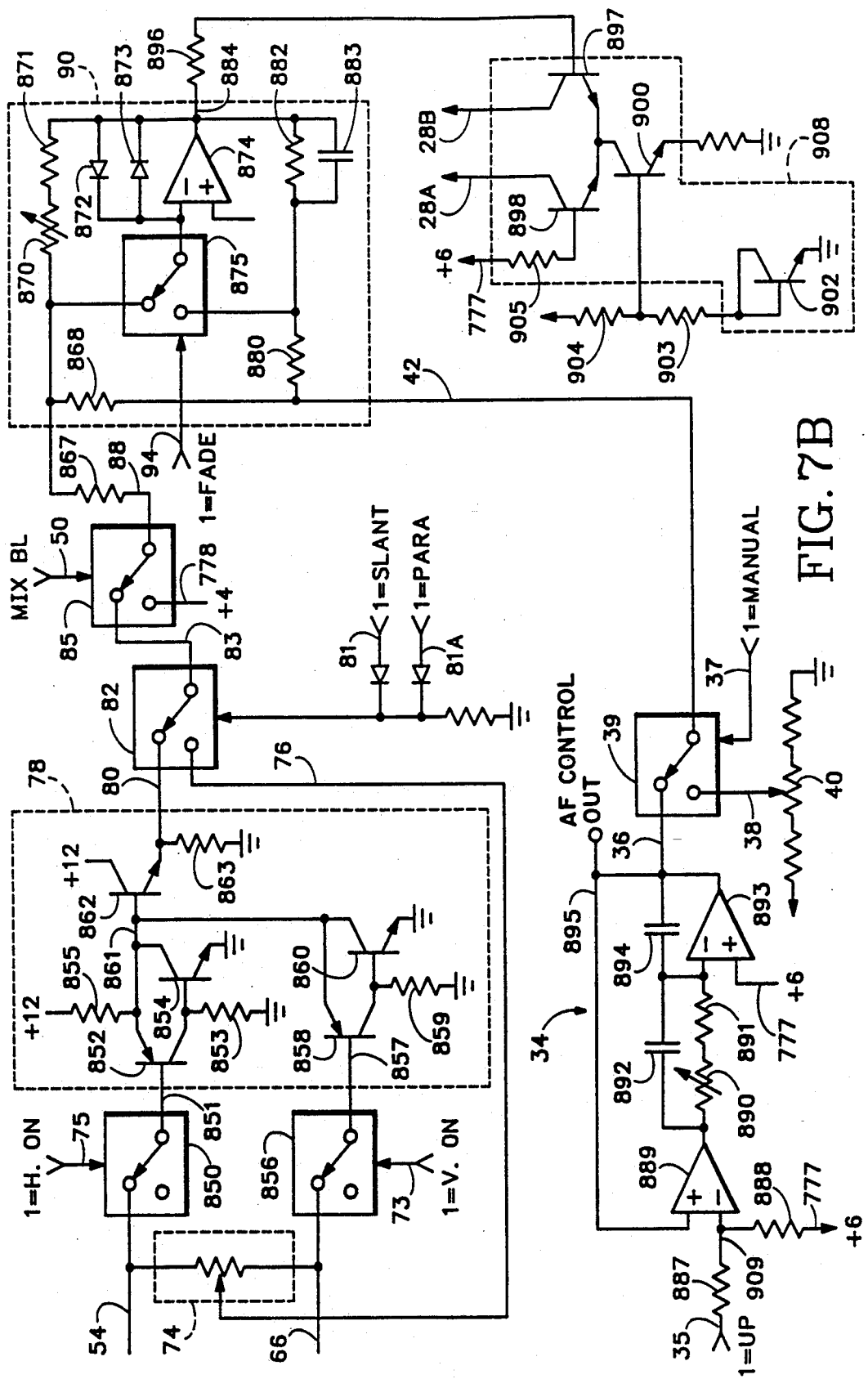

FIG. 7, which illustrates the effects waveform generator 29, is in two parts, namely FIGS. 7A and 7B. The effects waveform generator 29 comprises a vertical, or field rate, waveform generator 64 and a horizontal, or line rate, waveform generator 52. Vertical waveform generator 64 receives field blanking by way of the line 62. By means of control signals received over the pattern select lines 68 and 58, the vertical waveform generator can generate at its output 66 sawtooth, ramp or parabola waveforms at field rate, and by means of a control signal received over pattern select line 72 the selected waveform can be inverted. Mixed blanking is applied over the line 50 to the input of horizontal waveform generator 52. By means of control signals applied over pattern select lines 56 and 58 and mode select line 61, the horizontal waveform generator can generate at its output 54 sawtooth, ramp or parabola waveforms at line rate, and by means of a control signal received over mode select line 60 the selected waveform can be inverted.

The line rate and field rate waveforms are linearly mixed in the mixer 74 and are logically ANDed in the analog AND gate 78. Logical AND provides effects with straight vertical and horizontal edges such as a square while the mix provides effects with slanted edges such as a diamond. Switch 82 selects which type of effect is used by selecting the output 76 of the mixer 74 or the output 80 of the AND gate 78. Additionally, either line or field rate waveforms can pass to the switch 82 without being gated, depending on the state of pattern select lines 73 and 75, to provide simple horizontal or vertical effects.

The output 83 of switch 82 is applied to slicer 90 through blanking gate 85. Blanking gate 85 responds to mixed blanking on line 50 by selecting bias supply line 778 at +V/3, or 4 volts. Therefore, the voltage on line 88 during blanking is always derived from the bias supply line 778 and is never dependent on the voltage on line 54 or 66. Consequently, while an effect is in progress there is no possibility of there being a transition from. The blanking portion of the signal on line 16 to the blanking portion of the signal on line 18, or vice versa, and the corresponding possibility of horizontal shifting and color change in the resulting image. During an effect, the voltage on line 28 is such that switch 20 always selects the signal on line 16 during the blanking interval. At the end of the effect, the signal provided on line 22 is derived entirely from line 16 or line 18. Therefore, the switch from, e.g., the blanking portion of the signal on line 16 to the blanking portion of the signal on line 18, always takes place at the beginning or end of an effect and there is never a gradual wipe from blanking on line 16 to blanking on line 18.

Slicer 90 accepts the signal provided on the output line 88 of the blanking gate 85. A voltage applied to its slice level input 42 determines the voltage level at which the slicing occurs and thus sets the pattern size. The rise time of the effects waveform at output 28 is set by the gain of the slicer. The slicer 90 has two modes of operation, namely a high gain mode and a low gain mode, selectable by the signal on mode select line 94. The low gain mode is used for fades and dissolves. In the high gain mode, variable resistor 870 sets the gain of slicer 90. The slice level control signal on line 42 can be supplied either by the control ramp generator 34 for automatic operation or by the manually controlled potentiometer 40, depending on whether the switch 39, responsive to a control signal on mode select line 37, selects line 36 from the ramp generator 34 or line 38 from the manually controlled potentiometer 40. If the control signal on line 42 is provided by the ramp generator 34, the effect has a predetermined rate of transition, determined by the value of variable resistor 890, whereas if the control signal is provided by potentiometer 40 the rate of transition is under operator control.

The manner in which line rate and field rate waveforms are combined in order to provide an effect control signal will now be described.

Referring to FIG. 8(a), field rate sawtooth waveform is generated on line 66 from vertical blanking on line 62 and a line rate sawtooth waveform is generated on line 54 from mixed blanking on line 50. The two sawtooth waveforms are mixed to produce a mixed waveform on line 76. Dashed line 77 shows the slice level at which the slicer output changes state in response to the waveform on line 76. The slicer output waveform is generated on line 884. FIG. 8(b) shows the picture that would be seen on a television monitor. It will be appreciated that the sawtooths could be replaced by parabolas and a circle would result. Similarly the sawtooths could be replaced by ramps which would result in a diagonal split.

FIG. 8(c) shows the waveform generated on the lines 76 and 884 when the two ramp waveforms on lines 66 and 54 are applied to analog AND gate 78, which provides an output equal to the lesser of the two analog voltages received at its input. FIG. 8(d) shows the picture that would be displayed on a television monitor. It will be appreciated that the sawtooths could be replaced by ramps which would result in a corner insert with rectangular edges. If only one ramp is present, then no ANDing takes place and a split screen will result, either horizontally or vertically depending on which ramp is used. If only a horizontal rate sawtooth is present then the television monitor will display one picture in a vertical stripe down the center of the screen and portions of the second picture at both the left and right sides. A single sawtooth at vertical rate will give the same pattern but rotated by 90 degrees.

Considering now the effects waveform generator in greater detail, the line rate waveform generator consists of seven major components: two integrators 110 and 114, a one shot 96, a clamp 122 and three mode select switches 102, 106 and 118. These can provide one of the following waveforms: linear ramp, sawtooth and parabola, and the selected waveform can be provided in both normal and inverted orientation. All waveforms have the same positive and negative peak voltages, in this case V/3 and 2V/3, where V is the positive supply voltage.

As an aid to understanding, the operation of the line rate waveform generator will be described is three sections, with reference to FIGS. 9, 10 and 11, which show the circuit configurations, and resulting waveforms, when set for ramp, sawtooth and parabola respectively as selected by the mode control switches in response to signals received over the mode control lines. Only those elements relevant to a given configuration are shown in FIGS. 9, 10 and 11.

Figure 9A:
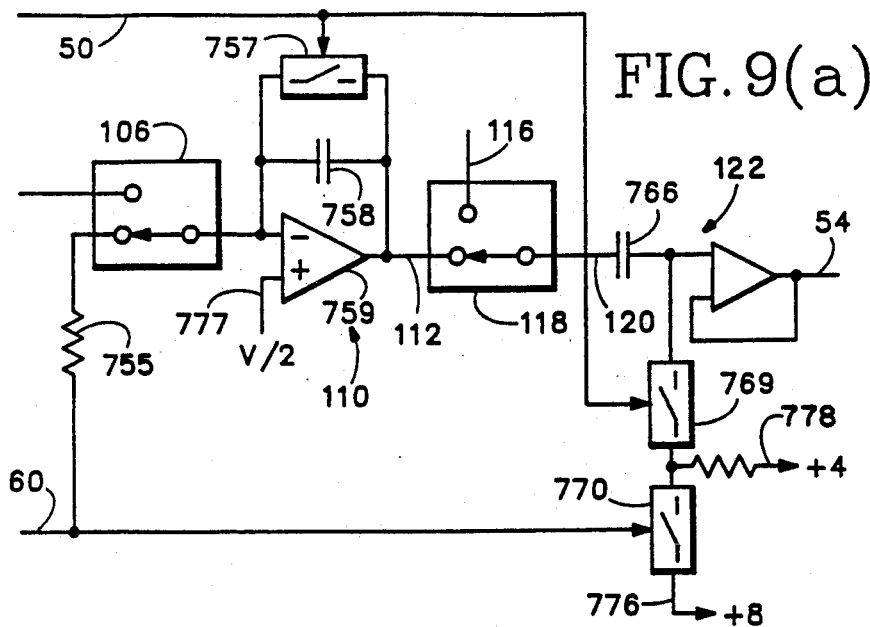

In FIG. 9(a), pattern select switch 106 is set to select line 60, which provides either +V or ground. First consider the case where mode select line 60 is at ground, FIG. 9(b). Resistor 755 draws a constant current from integrator 110 such that capacitor 758 must charge at an equal current in order to maintain a constant voltage at the inverting input of operational amplifier 759, resulting in a positive going ramp at the other side of capacitor 758, which is connected to the output 112 of the operational amplifier. This continues until the mixed blanking line 50 goes high and turns on electronic switch 757, discharging the capacitor 758 and setting the output of the operational amplifier 759 equal to its non-inverting input. This results in a waveform on line 112 which starts at V/2 and ramps up to about 5V/6 before it is reset to V/2. The signal on line 112 is passed by pattern select switch 118 and capacitor 766 to shunt clamp 769 which clamps the reset portion of the ramp to a voltage supplied by clamp switch 770, controlled by mode select line 60. In this case, the voltage is V/3 and so the resulting waveform on line 54 ramps from V/3 to 2V/3 and is then reset to V/3.

Figures 9B, 9C:
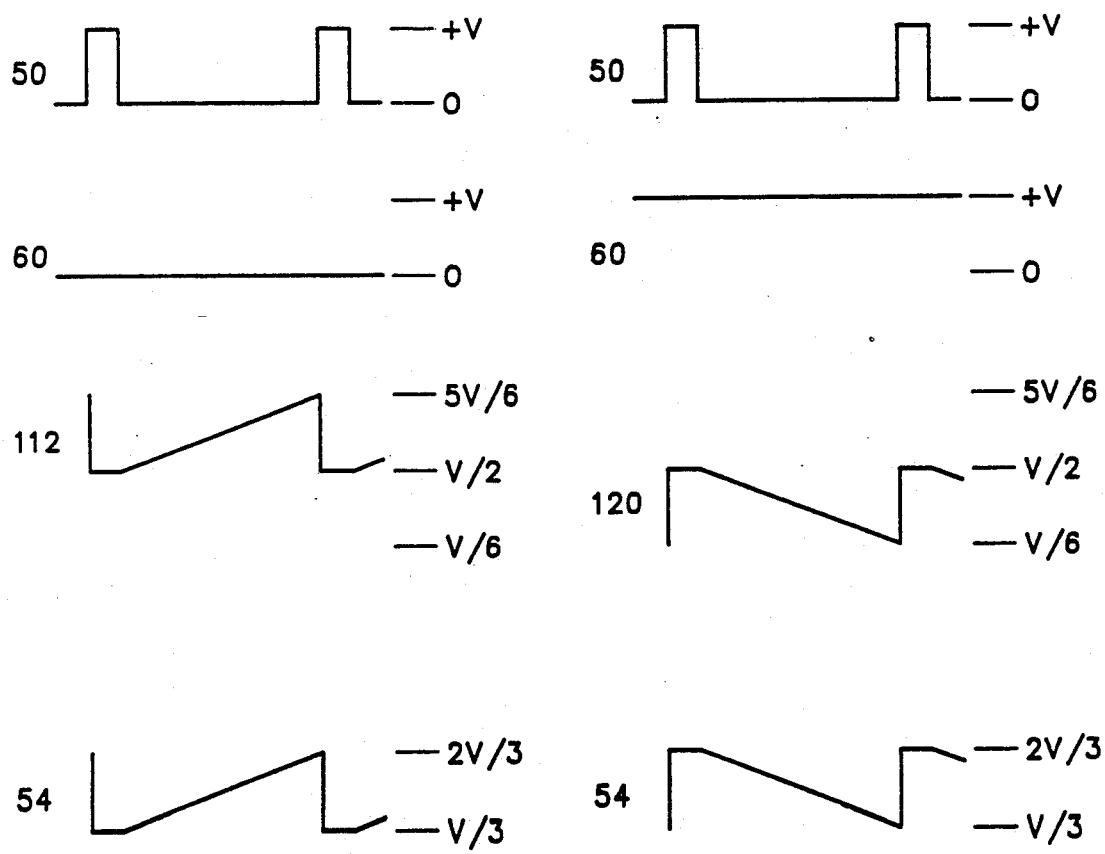

Now consider the case of mode select line 60 being at +V, FIG. 9(c). Resistor 755 now supplies current to integrator 110, forcing its output to go in the negative direction until it is reset by electronic switch 757. The signal on line 120 is transmitted via capacitor 766 to shunt clamp 769 which is turned on by mixed blanking on line 50. The clamp reference voltage is selected by switch 770 to be 2V/3 resulting in a waveform on line 54 which ramps downwards from 2V/3 to V/3 and is then reset to 2V/3.

Figure 10A:
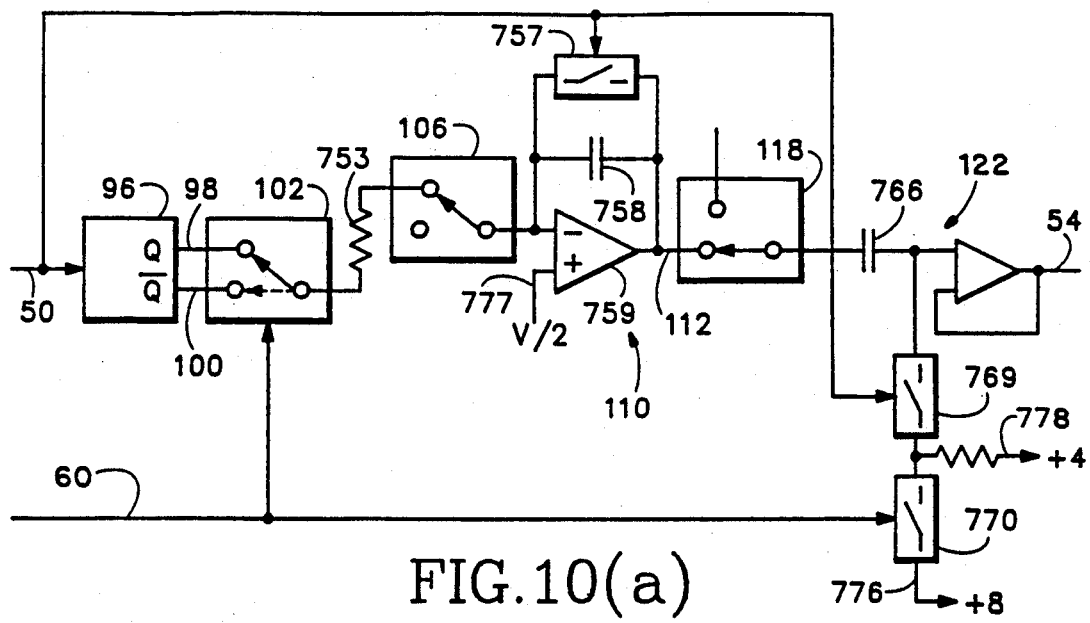
Figures 10B, 10C:
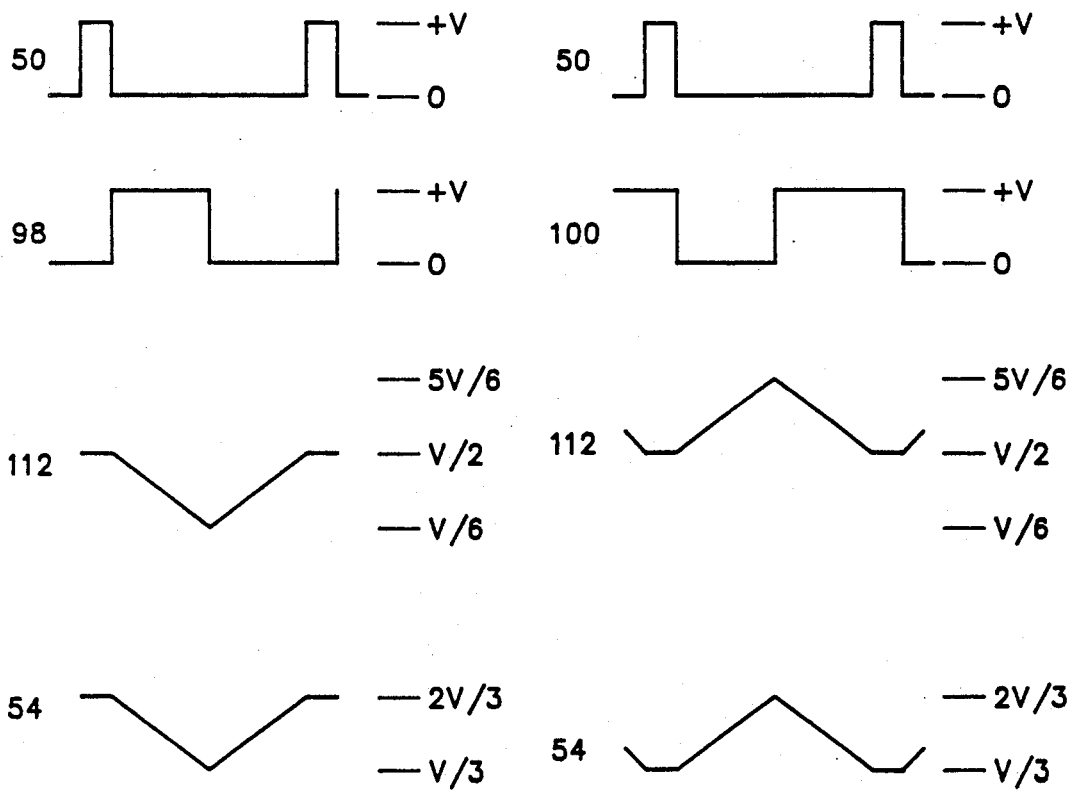

In the case of FIG. 10, pattern select switch 106 is set to select the output of mode select switch 102 instead of mode select line 60. Switch 102 is set to select the Q output of one shot 96. This one shot is configured to produce a positive voltage at its output 98 for a period equal to ½ of the low period of mixed blanking on line 50. Resistor 753 supplies a constant current to integrator 110 resulting in a negative going ramp at the output 112 of the operational amplifier 759. This continues until the one shot 96 times out, at which time its output goes low and resistor 753 now draws current from the integrator 110 forcing the output to ramp back towards its initial value. Ideally at a time coincident with the positive going transition of mixed blanking, the capacitor 758 will be completely discharged and the output 112 is at the bias voltage V/2. At this point in time the mixed blanking line 50 goes high and turns on electronic switch 757 insuring that capacitor 758 is completely, and therefore repeatably, discharged and that the output of the operational amplifier 759 is at the same potential as bias line 777. This results in a waveform on line 112 which starts at V/2 and ramps down to about V/6 before it reverses direction and ramps up towards V/2. The signal on line 112 is passed by pattern select switch 118 and capacitor 766 to shunt clamp 769 which clamps the reset portion of the sawtooth to a voltage 2V/3 supplied by clamp switch 770 under control of mode select line 60.

Still referring to FIG. 10, consider the case of switch 102 being set to select the NOT Q output 100 of one shot 96. This output has a voltage equal to ground for a period equal to ½ of the low period of mixed blanking on line 50, followed by a voltage equal to the supply voltage for the remainder of the cycle. Resistor 753 now draws a constant current from integrator 110 resulting in a positive going ramp at the output 112 of the operational amplifier. This continues until the one shot times out at which time its output goes high and resistor 753 now supplies current to the integrator 110 forcing the output to ramp back towards its initial value. Ideally at a time coincident with the positive going transition of mixed blanking the capacitor 758 will be completely discharged. At this point in time the mixed blanking line 50 goes high and turns on electronic switch 757 insuring that capacitor 758 is completely discharged and that the output of the operational amplifier 759 is at the same potential as its non-inverting input. This results in a waveform on line 112 which starts at V/2 and ramps up to about 5V/6 before it reverses direction and ramps down towards V/2. The signal on line 112 is passed to shunt clamp 769 which clamps the reset portion of the sawtooth to a voltage supplied by clamp switch 770 under control of mode select line 60, in this case V/3.

In FIG. 11(a), pattern select switch 106, mode select line 60 and integrator 110 are configured as in the case of FIG. 9(a). The output of the integrator 110 on line 112 is applied to level shifting resistors 760 and 779 which are driven by control line 60, such that the waveform at point 113 is always voltage symmetrical about bias supply 777. The signal at point 113 is applied to the second integrator 114 via resistor 762. For the first half of the horizontal line, resistor 762 draws current from the integrator, forcing its output to go positive. The current is not constant and in fact decreases as the center of the line is approached. This results in a waveform on line 116 which has a fast positive slope at its start and a gradual transition to a zero slope as the input current drops towards zero. At the middle of the line the input current reverses polarity and starts to increase such that capacitor 764 is forced to discharge, slowly at first then gradually faster resulting in a second half waveform that is the mirror image of the first half. The result is a positive going parabola at point 116. The signal at point 116 is passed via switch 118 and capacitor 766 to clamp 769, which is set by control line 60 to clamp to V/3 when mixed blanking line 50 is high. The result is a waveform on line 54 which is a positive parabola varying between V/3 and 2V/3.

Now consider the case where the mode select line 60 is at a high voltage. As described with reference to FIG. 9, a negative going ramp will appear at point 112. Due to the reversal of mode select line 60, a voltage symmetrical ramp will still appear at point 113, but it is negative going. Integrator 114 performs as above but the output parabola is now negative going. The reversal of line 60 sets the clamp reference voltage via switch 770 to 2V/3 and the output waveform still varies between V/3 and 2V/3.

The field rate waveform generator 64 is identical to the line rate waveform generator 52 except that time constants are about 263 times as long, the input signal is field blanking on line 62, the output is on line 66, the pattern select lines are 58, 68, and the only mode select line is 72, there is being no mode select line corresponding to line 61 of the line rate waveform generator. Field rate waveform generator will not be described further, therefore.

Referring again to FIG. 7B, horizontal and vertical waveforms are provided on lines 54 and 66 respectively. Potentiometer 74 selectively mixes the two waveforms. The AND block 78 is composed of transistors 852, 854, 858, 862 and 860 in conjunction with resistors 855, 853, 859 and 863. Transistors 852 and 854 form a compound transistor which in response to voltage on line 851 can pull the voltage at point 861 down from +V but cannot raise it. Similarly, transistors 858 and 860 also pull down the voltage at point 861 in response to the voltage on line 857. Thus an analog AND function is implemented, i.e., the voltage at point 861 is only as great as the lesser of the two input voltages on lines 851 and 857, shifted in the positive direction by the base-emitter drop of one transistor. This shift is compensated for by transistor 862, and, therefore the AND block 78 has only a small overall DC offset. Switches 850 and 856 in response to control signals on lines 73 and 75 provide the ability to enable either or both of the horizontal and vertical waveforms. When only one is enabled, it is passed to the output of the AND block without change. Selector 82, in response to control signals on the ORed control lines 81 and 81A, selects either mixed or ANDed waveforms to pass on to the blanking gate 85. Blanking gate 85 provides on its output line 88 a uniform voltage of V/3 during the mixed blanking time for any particular waveform or combination of waveforms selected. As explained previously, this ensures that all waveforms are at the same voltage during video blanking and that any transition of sync and burst will occur in one sharp step instead of throughout a given transition from one video signal to another, in order to reduce the visibility of picture shifts and color phase errors.

The slicer 90 comprises an operational amplifier 874 with two different feedback networks selected by electronic switch 875 followed by a differential amplifier 908 comprising an integrated circuit of type 3046. The differential amplifier 908 provides differential drive to the electronic video switch 20. The feedback network composed of components 868, 870 and 871 is used for video effects and allows the operational amplifier 874 to operate at an adjustable gain of approximately 0.1 to 2. The second network composed of components 880, 882 and 883 is used for fades and sets operational amplifier gain at approximately 0.007 in order to provide a few hundred millivolts output at 884 in response to a 6v control signal on line 42. The first feedback network accepts the waveform from line 88 via resistor 867 and sums it with the control voltage from line 42 via resistor 868. Since the input waveforms all have sloping edges, variable resistor 870 is provided in order to adjust the gain of amplifier 874 and thereby set the sharpness of the output transition, which in turn sets the sharpness of the resultant video transition. A pair of diodes 872 and 873 provide voltage limiting to avoid saturating the operational amplifier. It is undesirable that the amplifier 874 be saturated, since it would result in a slow recovery and a distorted waveform at high gains. The second feedback network passes the control signal from line 42 at a lower level to the operational amplifier output 884 and is used by the electronic video switch for video fades and dissolves in response to the voltage on line 42.

Resistors 904 and 903 with diode connected transistor 902 provide a temperature compensated bias to current source transistor 900. Transistors 897 and 898 distribute this current to control line 28, comprising push-pull lines 28A and 28B, in proportion to the difference in their base voltages. The base of transistor 898 is connected to a constant voltage source 777 via resistor 905. The base of transistor 897 receives the input signal, via resistor 896, which is symmetrical about the potential of voltage source 777.

The control ramp generator 34 has an input logic line 35 which is connected to resistive divider 887 and 888 to provide either $+\frac{1}{4}V$ or $+\frac{3}{4}V$ to the non-inverting input of operational amplifier 889. Assuming that logic line 35 has been in the high state for a long period of time, both inputs of amplifier 889 will be at a voltage of 3V/4, its output will be at V/2, and only bias current will flow through resistors 890 and 891. The charge on capacitor 894 will not change, and the output voltage on line 895 will be equal to the input voltage at point 909. Now assume that the logic input line 35 goes to the low state, so that resistors 887 and 888 will provide V/4 at point 909. Since line 895 is at 3V/4, operational amplifier 889 will have an output saturated at the positive supply rail providing a voltage drop across resistors 890 and 891 to supply current to operational amplifier 893. This current is balanced by a current supplied by the output of amplifier 893 to capacitor 894 which charges in a linear fashion providing a linear ramp on line 895. This charging continues until the output voltage on line 895 is equal to the voltage on line 909, i.e., the two inputs of amplifier 889 are equal, resulting in its output coming out of saturation and cutting off the current through resistors 890 and 891. It will be recognized that this is a stable state and will remain until the logic line 35 again changes. If the logic line 35 goes to the high state then the above process will repeat with only certain current polarities changing. Capacitor 892 is provided in order to suppress oscillation in the quiescent state The pattern select key logic block 70 (FIGS. 12A and 12B) comprises a 3×5 key matrix 224, key detect logic 220, row latch array 216, column latch array 226 and LED matrix 228. The outputs 56, 75, 68, 72 and 58 of the latches 216 and 226 are used to select the waveforms to be generated by the line and field rate waveform generators, i.e. ramp, sawtooth, parabola and waveform invert.

If the user presses switch 950 of the pattern select key logic block 70, a conduction path will be set up including resistor 971, transistor 965, switch 950 and resistor 981. The voltage at the "D" input of latch 986 will be about two diode drops below V. Transistor 965 will turn on and pull the "D" input of latch 978 to a similar high state. Transistor 972 will turn on and capacitor 974 will deliver a short pulse to resistor 975 and to one end of resistor 976. When the next vertical blanking pulse appears on line 62, diode 977 will allow line 222 to pass this pulse to the clock inputs of all latches 978–980 and 986–990. If the pulse ends before the user releases the switch, latches 978 and 986 will latch a logic one from their "D" inputs and the other latches 979, 980 and 987–990 will will latch a logic zero from their "D" inputs. It will readily be seen that if any single switch 950–964 is pressed a unique pair of latches will be set, one latch 978–980 for the row and one latch 986–990 for the column.

LED indicators 1009–1023 are provided to indicate the current state of the latches. A single LED is illuminated when one of transistors 1003–1005 is turned on via lines 1006–1008 connected to the Q outputs of latches 978–980 and one of open collector, non-inverting buffers 995–999 is turned on by one of latches 986–990 being set. Diodes 1024, 1025 and 1026 connected to line 1027 (FIG. 16) supply a predefined power on state.

Latch 979 if set commands a horizontal sawtooth via line 56. Latch 980 when not set commands the horizontal waveform be enabled via line 75. NAND gate 991 enables the vertical sawtooth via line 68 when either latch 989 or latch 990 is not set. NAND gate 992 enables the invert vertical waveform state via line 72 when either latch 987 or latch 990 is not set. NAND gate 994 and inverter 993 enable the parabola mode via line 58 when both latches 980 and 986 are set.

Figure 13A:
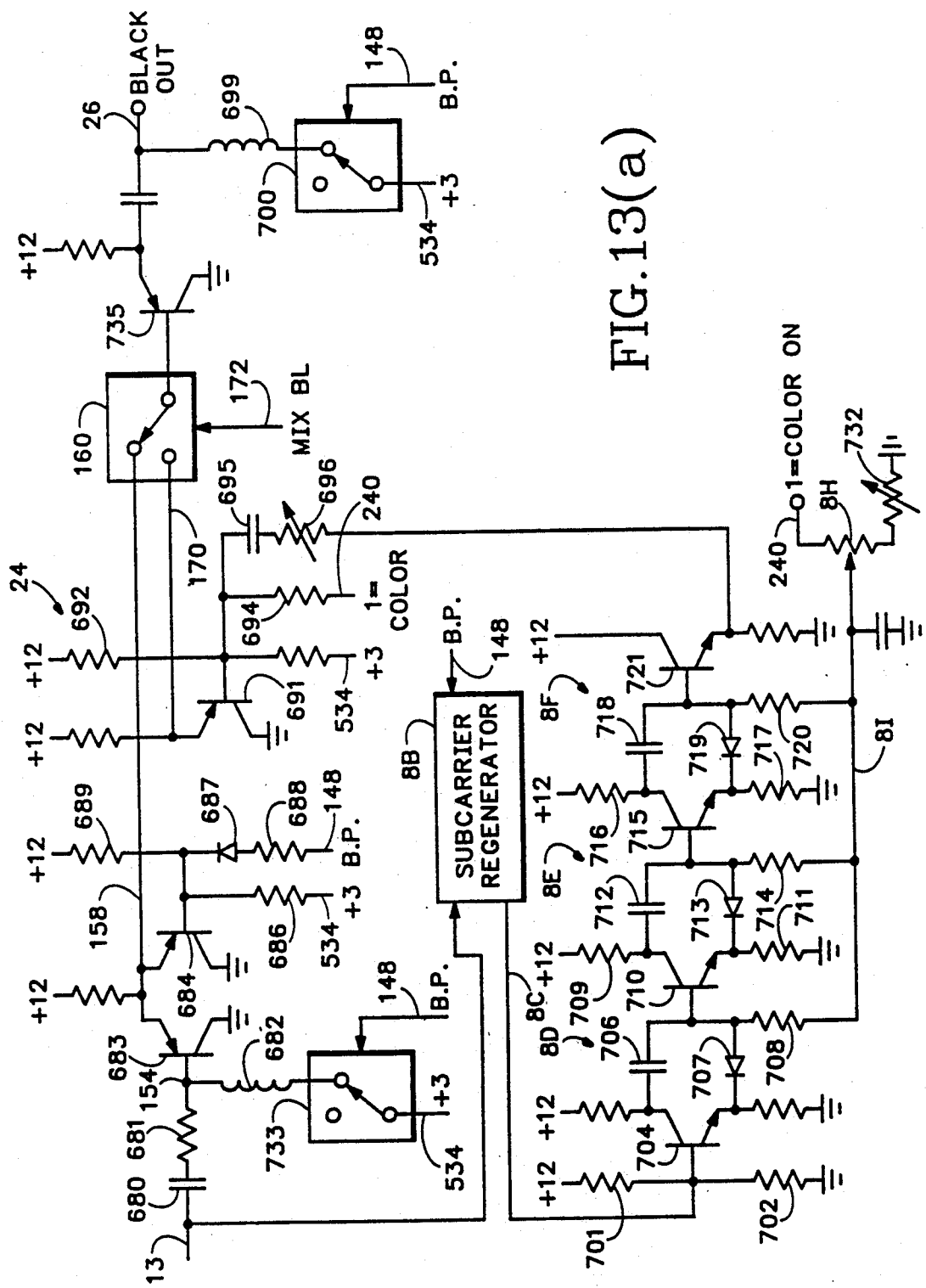
FIG. 13(a) is a schematic diagram of the background generator, FIG. 13(b) are waveforms associated with the background generator.
Figure 13B:
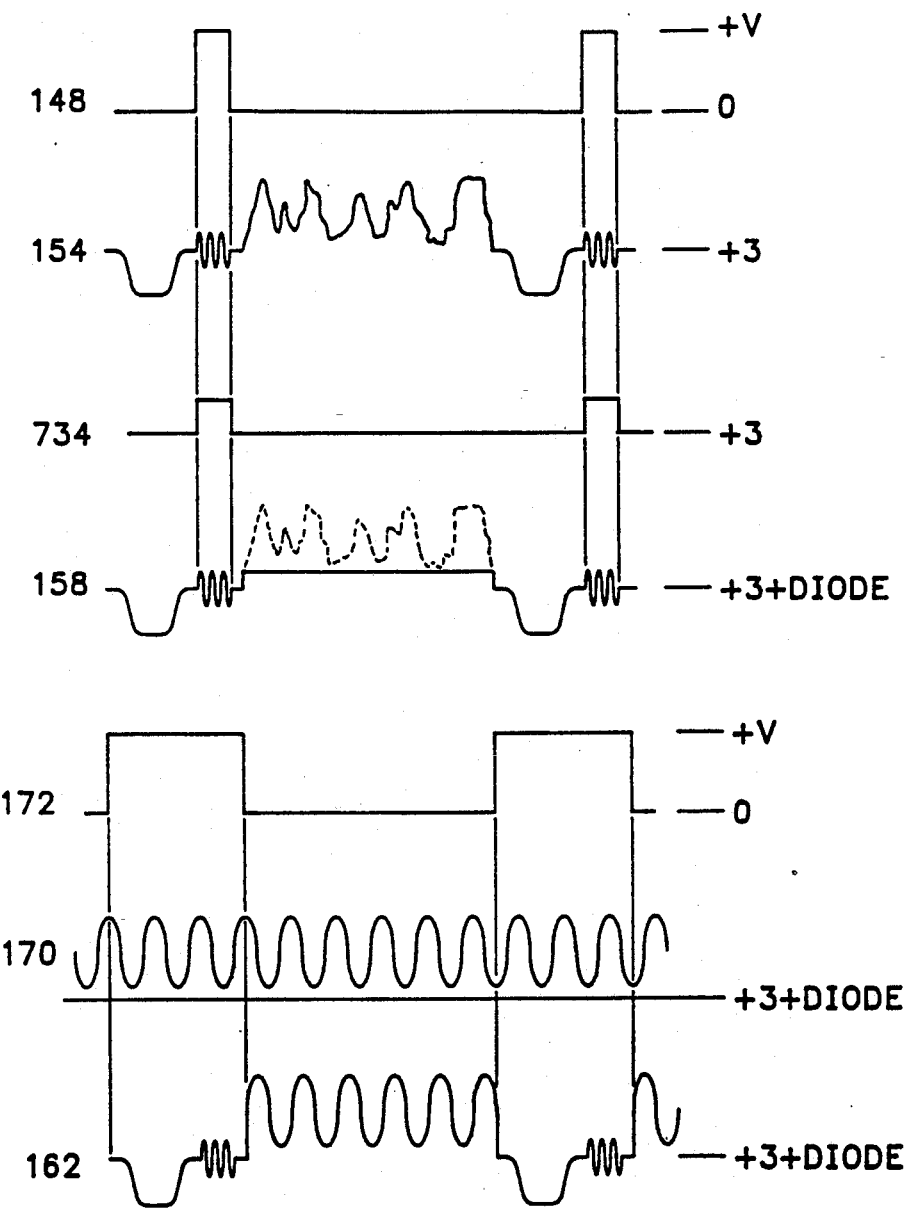

Referring to FIG. 13(a), video is received by the background generator 24 from the input switch via line 13, which is coupled to the base of transistor 683 by the series combination of capacitor 680 and resistor 681. Electronic switch 733, which is driven by the back porch pulse on the line 148, shunts the base of transistor 683 to the bias line 534 during back porch, thus providing a video signal with a constant back porch voltage to transistor 683 via line 154. Inductor 682 and resistor 681 form a burst phase correction network and are chosen so that the burst of the background signal on line 26 has the same phase as the burst of the input video on line 16. Video with sync would normally appear at the emitter of transistor 683, but transistor 684 also has its emitter connected to line 158 and limits the positive excursion of voltage on this line. The base of transistor 684 is fed via resistor 686 from the same bias supply line 534 as the video clamp 733, with a slight positive offset provided by resistor 689, and thus is a few tenths of a volt above the back porch level. Any video appearing at the base of transistor 683 that is above this level will be clipped. Therefore what appears on line 158 is sync from the incoming video but with all video clipped off. The base of transistor 684 is also fed via resistor 688 and diode 687 with the back porch pulse on line 148. This allows burst to be passed without clipping. Amplifier transistor 691 is biased from bias line 534 with an offset provided by resistors 692 and 694. When mode select line 240 is high, then the offset will be considerable and provide the luminance values for the background color. When line 240 is low, the effect is slight and provides setup in the background video. Chroma is coupled into the base of transistor 691 via variable resistor 696 and capacitor 695. Transistors 683, 684 and 691 all have similar base voltages and therefore similar emitter voltages. Mixed blanking 172 is used to drive electronic switch 160 which selects between line 158 containing sync with video clipped off and line 170 containing a DC voltage, optionally with chroma, such that the output lead contains a time composite of sync from incoming video and a fixed voltage optionally with chroma. Transistor 735 provides a low impedance drive to the clamp which follows. Switch 700 is driven by the back porch pulse via line 148 to connect the output line 26 to the bias supply 534 via inductor 699 during the back porch time, thus forcing the video on line 26 to have a back porch voltage level that is constant and matches that on lines 15 and 16 so that switching between them will be invisible. The original sync and burst are preserved, but new video is inserted during the active portion of the horizontal interval.

Chroma subcarrier regenerator module 8B supplies a continuous constant amplitude color subcarrier when supplied with video via line 13, back porch pulse via line 148, power and ground. Its output 8C is routed to the base of transistor 691 through three identical phase shifting stages 8D, 8E and 8F.

Each phase shifting stage comprises a transistor whose base constitutes the input terminal of the stage, a capacitor connected between the collector of the transistor and the output terminal of the stage, and a diode connected between the emitter of the transistor and the output terminal. The diode is a conventional silicon diode, not a variable capacitance diode, and it functions essentially as a variable resistor. Operation of the first phase shifting stage, comprising transistor 704, capacitor 706 and diode 707 will be described. Resistors 701 and 702 provide bias for transistor 704. Output is taken from both the collector and emitter and combined via capacitor 706 and diode 707 in a ratio controlled by the conduction of diode 707. When diode 707 is conducting heavily, the effective output is from the emitter and thus has little phase shift, and when it is conducting lightly the output comes mostly from the collector. The output on the collector is 180 degrees out of phase with that on the emitter. The capacitor is selected to shift the phase of the output on the collector. Therefore, the phase shift from the input terminal to the output terminal depends on the conduction of the diode 707. Diode conduction is controlled by the current supplied by resistor 708. This type of all pass network has very little amplitude variation with phase if linear components are used. It will be noted that the voltage at the anode of diode 707 is equal to the voltage at the base of transistor 704 and therefore can be connected to the next stage without there being any need for a biasing network for the next stage. Two more phase shift stages are composed of transistors 710 and 715, resistors 709, 711, 714, 717, 716 and 720, diodes 713 and 719 and capacitors 712 and 718. Transistor 721 provides a low impedance drive.

The amount of phase shift is set by the diode bias line 8I which is user controlled by potentiometer 8H with a lower limit set by resistor 732 and an upper limit set by the logic high on mode select line 240. Line 240 also serves to turn off the chroma when it goes to logic low, cutting off transistors 710, 715 and 721, whose bases are supplied by the diode coupling.

The audio switcher/fader 43 (FIG. 14) has right and left channels. Only the right channel is shown in FIG. 14. The left channel is identical. The right channel itself has two identical input channels A and B, associated respectively with the two video input terminals A and B (FIGS. 1 and 4(a)). Only channel A will be described in detail. An audio input signal is applied to the input terminal 250 of input channel A. Terminal 250 is returned to ground via resistor 1150 and is coupled via capacitor 1151 to resistor 252 which supplies a current to the following stages. Selector 254 comprises switches 1154 and 1155 which pass audio from line 251 to 264 and from line 253 to 258, or vice versa, depending on the state of the control signal on mode select line 11. Thus, the selector 254 provides a swap inputs function. In response to a control signal on mode select line 21A, switch 260 provides muting of the audio on line 258 by inserting capacitor 1156 to shunt the audio to ground and resistor 1157 to provide a higher impedance path. In the unmuted state, switch 260 connects line 258 to line 262.

Lines 262 and 264 are connected to a modulator 266, which is an integrated circuit of type 1496. Resistor 1177 and capacitor 1158 provide a decoupled voltage source for supplying bias current for the constant current sources in the modulator via resistor 1159, bias for the lower transistor pair via resistors 1160 and 1161, and a collector voltage source for the output quad transistors via resistors 1162 and 1163. Resistor 1177 and capacitor 1158 also provide bias for the output amplifier 272 via resistors 1169 and 1170 with further decoupling by capacitor 1171. Audio current is applied to each of the lower transistor pair emitters via lines 264 and 262. These currents appear at outputs 270 and 268, mixed in direct proportion to the control voltage applied to the control lines 895 see also (FIG. 7B). Capacitor 1168 couples current from output 268 to the inverting input of operational amplifier 1178 which is arranged that the output voltage at point 1174 is a function of input current supplied to its inverting input. Resistor 1173 sets the current-to-voltage conversion factor and thus the overall gain. Capacitor 1172 is provided to reduce the gain at frequencies above the audio range. Capacitor 1175 couples the audio signal generated at point 1174 to the output 274. Resistor 1176 returns the output to ground.

Figure 15:
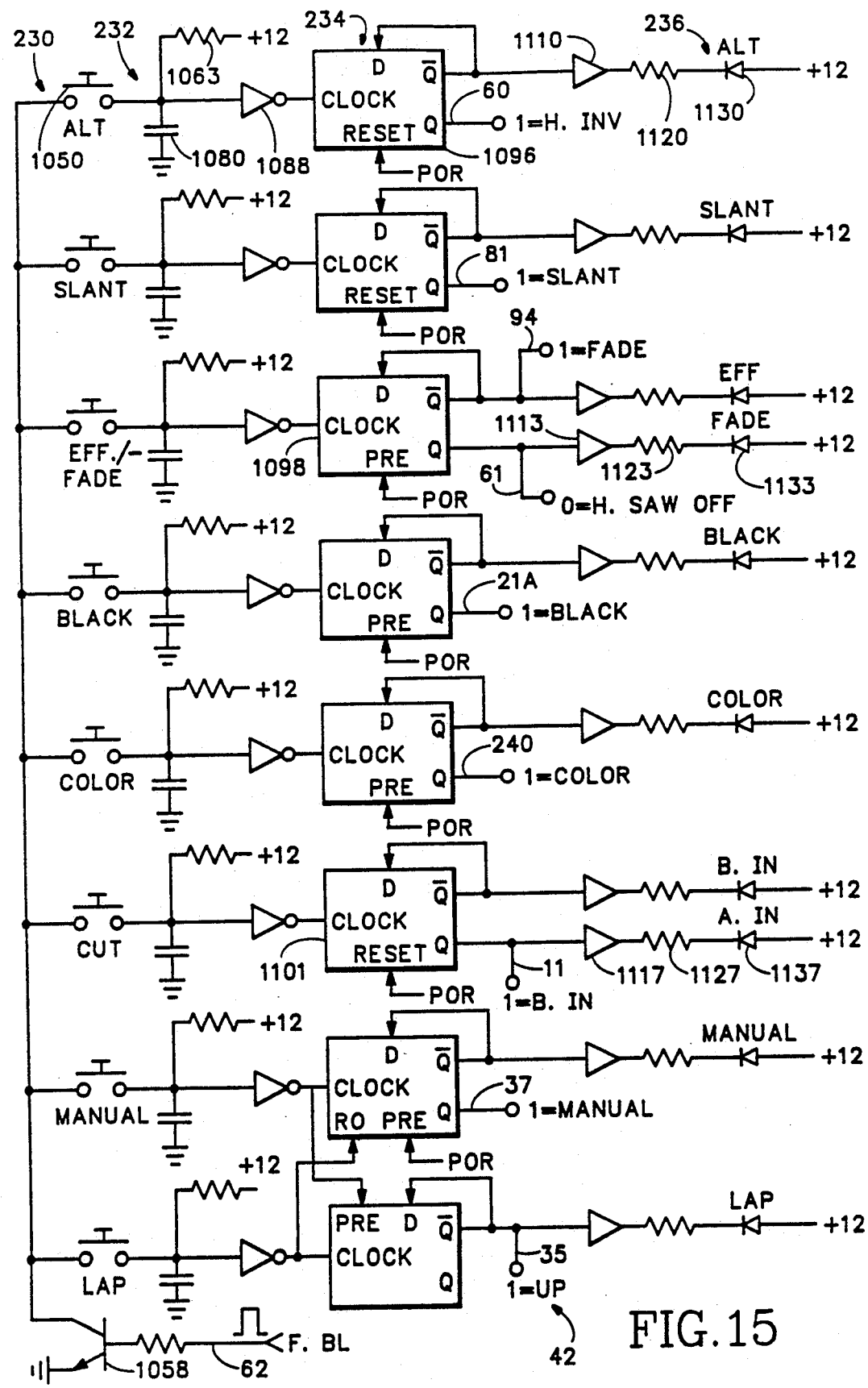
FIG. 15 is a schematic diagram of the mode select key logic.

The mode select key logic 42, shown in detail in FIG. 15, comprises an array 230 of key switches, debouncing networks 232, latches 234 and an LED array 236. When the user presses the key switch 1050, for example, and a vertical blanking pulse is present on line 62, causing transistor 1058 to conduct, the associated capacitor 1080 will be discharged. After the switch is released, resistor 1063 will recharge capacitor 1080. Schmitt trigger logic gate 1088 will provide a positive pulse at its output which toggles the "D" flip-flop 1096 connected as a toggle by connection of its NOT Q output back to its "D" input. The NOT Q output of flip-flop 1096 is also connected to a non-inverting buffer 1110 in order to turn on an LED 1130 via current limiting resistor 1120. The other flip-flops are similarly connected. Additionally the Q outputs of flip-flops 1098 and 1101 are connected to buffers 1113 and 1117 to turn on LEDs 1133 and 1137 via limiting resistors 1123 and 1127. A power on reset pulse is connected to each flip-flop in order to establish a predefined power on state.

The following outputs are supplied by the latches:
Invert horizontal waveform 60.
Select slant waveform 81.
Select fade mode (effects off) 94.
Disable horizontal sawtooth generator 61.
Select video background on line 21A as 2nd input to electronic video switch 14.
Add color to video background 240.
Select manual transitions mode 37.
Fade/effect 35.

The power on reset pulse on line 1027 (FIG. 16) is created when the V+ line goes from low to high, the voltage on the V+ line being differentiated by capacitor 1060 and resistor 1062. Diode 1061 prevents this line from going significantly below ground when the V+ line goes from high to low.

It will be appreciated that the invention is not restricted to the effects generated that has been described and illustrated, and that variations may be made therein without departing from the scope of the invention as defined in the appended claims and equivalents thereof.

I claim:

1. A video signal generator comprising a level slicer having an input terminal for receiving a video signal and removing signal portions above the blanking level, disable means for selectively disabling the slicer, a subcarrier regenerator connected to the input terminal for generating a continuous wave signal at subcarrier frequency, a phase shifter for selectively shifting the phase of the continuous wave signal, and switch means for selectively combining the output of the slicer with the output of the phase shifter to provide an output video signal.

2. A video signal generator according to claim 1 wherein the phase shifter has an input node at which it receives the continuous wave signal and also has a second node coupled to the switch means and at which the phase shifter provides a signal at the same frequency as the continuous wave signal and in controllable phase relationship therewith, and wherein the phase shifter comprises:
- a semiconductor device having a first terminal connected to said input node, a second terminal at which it provides a signal at the same frequency as the continuous wave signal and in phase therewith, and a third terminal at which it provides a signal at the same frequency as the continuous wave signal and out of phase therewith,
- a capacitor connected between the third terminal and said second node,
- a diode connected between the second terminal and said second node, and
- means for biasing the diode to adjust the conductivity thereof.

3. A video signal generator according to claim 2, wherein said semiconductor device is a bipolar transistor of which the base, emitter and collector constitute the first, second and third terminals respectively and which conducts current through the base-emitter junction in a predetermined direction relative to the emitter, and the diode is a semiconductor diode of the same semiconductor material as the transistor and is connected to conduct current in the same direction, relative to the emitter, as the base-emitter junction of the transistor, whereby said second node is maintained at substantially the same d.c. potential as the base of the transistor.

4. A video signal generator according to claim 3, wherein said second node is connected to the base of a second bipolar transistor, and the phase shifter also comprises a second capacitor connected between the collector of the second capacitor and a third node and a second diode connected between the emitter of the second transistor and said third node, the biasing means being connected to adjust the conductivity of the second diode.

5. A video signal generator according to claim 1, comprising a timing generator for receiving the video signal and generating a disable pulse during the back porch of the horizontal blanking interval of the video signal, the timing generator being connected to said disable means for disabling the level slicer during the back porch of the horizontal blanking interval.

6. A video signal generator according to claim 1, wherein the phase shifter comprises at least one phase-shifting stage having an input node coupled to the output of the subcarrier regenerator and an output node coupled to the switch means, the phase shifting stage being operative to provide at its output node a signal at the same frequency as the signal present at its input node and adjustable in phase relative thereto through a predetermined range of angles.

7. A video signal generator according to claim 6, wherein the phase-shifting stage comprises:
- a semiconductor device having a first terminal connected to said input node, a second terminal at which it provides a signal at the same frequency as the signal present at said input node and in phase therewith, and a third terminal at which it provides a signal at the same frequency as the signal present at its input node and out of phase therewith,
- a capacitor connected between the third terminal and said output node,
- a diode connected between the second terminal and said output node, and
- means for biasing the diode to adjust the conductivity thereof.

8. A video signal generator according to claim 6, wherein the phase shifter comprises first, second and third phase-shifting stages, the input node of the first phase-shifting stage being connected to the output of the subcarrier regenerator, the input nodes of the second and third phase-shifting stages being connected to the output nodes of the first and second phase-shifting stages respectively, and the output node of the third phase-shifting stage being connected to the switch means, and wherein each said phase-shifting stage is operative to provide at its output node a signal at the same frequency as the signal present at its input node and adjustable in phase relative thereto through up to substantially 120 degrees.

9. Video signal switching apparatus comprising:
- a switching circuit having first and second input terminals for receiving first and second synchronous video input signals, a control terminal, an output terminal, and means for selectively conducting said first video signal or said second video signal to the output terminal in dependence upon a switching signal applied to said control terminal, and
- a switching signal generator for generating the switching signal, said switching signal generator being connected to said control terminal for applying the switching signal thereto for causing the switching circuit to change progressively from a first condition in which the first video input signal is conducted to said output terminal to a second condition in which the second video signal is conducted to said output terminal, said switching signal generator including means for maintaining the switching signal at a level such that the switching circuit does not change from one of said first and second conditions to the other of said first and second conditions during the blanking interval of the first and second video signals.

10. A video effects generator comprising:
- an electronic video switch having first and second input terminals for receiving first and second synchronous video input signals, at least one control terminal, an output terminal, and means for conducting said first video input signal or said second video input signal to the output terminal in dependence upon an effects waveform signal applied to said control terminal,
- an effects waveform generator for generating the effects waveform signal, the effects waveform generator being connected to the control terminal of the electronic video switch for applying the effects waveform signal thereto, and
- a background signal source for applying a background signal to the second input terminal of the electronic video switch as the second video input signal, said background signal source comprising means for generating a continuous wave subcarrier frequency signal of which the phase is selectively adjustable, and multiplexing means for multiplexing the adjustable-phase continuous wave signal with at least the sync of the first video input signal to provide the background signal.

11. A video effects generator according to claim 10, wherein the means for generating the continuous wave subcarrier frequency signal comprise a subcarrier regenerator for generating a continuous wave signal at subcarrier frequency and in constant phase relationship with the subcarrier burst of the first video input signal, and a phase shifter for receiving the continuous wave signal from the subcarrier regenerator as an input signal and providing a continuous wave output signal at the same frequency as its input signal and selectively adjustable in phase relative to its input signal.

12. A video effects generator according to claim 11, wherein the phase shifter has an input node connected to receive the continuous wave signal provided by the subcarrier regenerator, and also has a second node which is coupled to the multiplexing means and at which the phase shifter provides a signal at the same frequency as the continuous wave signal and in a controllable phase relationship therewith, said phase shifter comprising:
   a semiconductor device having a first terminal connected to said input node, a second terminal at which it provides a signal at the same frequency as the continuous wave signal and in phase therewith, and a third terminal at which it provides a signal at the same frequency as the continuous wave signal and out of phase therewith,
   a capacitor connected between the third terminal and said second node,
   a diode connected between the second terminal and said second node, and
   means for biasing the diode to adjust the conductivity thereof.

13. A video effects generator according to claim 12, wherein said semiconductor device is a bipolar transistor of which the base, emitter and collector constitute the first, second and third terminals respectively and which conducts current through the base-emitter junction in a predetermined direction relative to the emitter, and the diode is a semiconductor diode connected to conduct current in the same direction, relative to the emitter, as the base-emitter junction of the transistor, whereby said second node is maintained at substantially the same d.c. potential as the base of the transistor.

14. A video effects generator according to claim 12, wherein the phase shifter also comprises a second semiconductor device having a first terminal connected to said second node, a second capacitor connected between a second terminal of the second semiconductor device and a third node and a second diode connected between a third terminal of the second semiconductor device and said third node, the biasing means being connected to adjust the conductivity of the second diode, whereby a signal at the same frequency as the continuous wave signal but shifted in phase with respect thereto is provided at the third node.

15. A video effects generator according to claim 14, wherein the phase shifter comprises at least one phase-shifting stage having an input node coupled to the output of the subcarrier regenerator and an output node coupled to the multiplexing means, the phase-shifting stage being operative to provide at its output node a signal at the same frequency as the signal present at its input node and adjustable in phase relative thereto through a predetermined range of angles.

16. A video effects generator according to claim 15, wherein the phase-shifting stage comprises:
   a semiconductor device having a first terminal connected to said input node, a second terminal at which it provides a signal at the same frequency as the signal present at said input node and in phase therewith, and a third terminal at which it provides a signal at the same frequency as the signal present at its input node and out of phase therewith,
   a capacitor connected between the third terminal and said output node,
   a diode connected between the second terminal and said output node, and
   means for biasing the diode to adjust the conductivity thereof.

17. A video effects generator according to claim 14, wherein the phase shifter comprises first, second and third phase-shifting stages, the input node of the phase-shifting stage being connected to the output of the subcarrier regenerator, the input nodes of the second and third phase-shifting stages being connected to the output nodes of the first and second phase-shifting stages respectively, and the output node of the third phase-shifting stage being connected to the multiplexing means, and wherein each phase-shifting stage is operative to provide at its output node a signal at the same frequency as the signal present at its input node and adjustable in phase relative thereto through up to substantially 120 degrees.

* * * * *

UNITED STATES PATENT AND TRADEMARK OFFICE
CERTIFICATE OF CORRECTION

PATENT NO. : 5,109,280

DATED : April 28, 1992

INVENTOR(S) : James A. Karlock

It is certified that error appears in the above-identified patent and that said Letters Patent is hereby corrected as shown below:

Column 2, line 24, "FIGS. 8(a) and 8(b)" should read --FIGS. 8(a) to 8(d)--.

Column 4, line 23, "one-fourth" should read --one quarter--.

Column 6, line 54, ". The" should read --the--.

Column 11, line 33, insert a period (.) after "state".

Column 15, line 3, insert a comma (,) after "claim 1".

Column 15, line 41, "second capacitor" should read --second transistor--.

Column 18, line 10, "according to claim 14" should read --according to claim 11--.

Column 18, line 35, "according to claim 14" should read --according to claim 11--.

UNITED STATES PATENT AND TRADEMARK OFFICE
CERTIFICATE OF CORRECTION

PATENT NO. : 5,109,280
DATED : April 28, 1992
INVENTOR(S) : James A. Karlock

It is certified that error appears in the above-indentified patent and that said Letters Patent is hereby corrected as shown below:

Column 18, line 37, "input node of the phase-" should read —input node of the first phase—.

Signed and Sealed this

Fourth Day of October, 1994

Attest:

BRUCE LEHMAN

*Attesting Officer*  *Commissioner of Patents and Trademarks*